United States Patent
Barroso et al.

(10) Patent No.: US 6,751,720 B2
(45) Date of Patent: Jun. 15, 2004

(54) METHOD AND SYSTEM FOR DETECTING AND RESOLVING VIRTUAL ADDRESS SYNONYMS IN A TWO-LEVEL CACHE HIERARCHY

(75) Inventors: Luiz André Barroso, Mountain View, CA (US); Kourosh Gharachorloo, Menlo Park, CA (US); Andreas Nowatzyk, San Jose, CA (US); Robert J. Stets, Jr., Palo Alto, CA (US); Mosur Kumaraswamy Ravishankar, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 298 days.

(21) Appl. No.: 10/042,054

(22) Filed: Jan. 7, 2002

(65) Prior Publication Data

US 2003/0023814 A1 Jan. 30, 2003

Related U.S. Application Data

(63) Continuation-in-part of application No. 09/878,982, filed on Jun. 11, 2001.
(60) Provisional application No. 60/210,675, filed on Jun. 10, 2000.

(51) Int. Cl.[7] ............................................. G06F 12/00
(52) U.S. Cl. .................. 711/210; 365/230.01; 711/117; 711/203
(58) Field of Search ..................... 365/230.01; 711/117, 711/203, 210

(56) References Cited

U.S. PATENT DOCUMENTS

| | | | |
|---|---|---|---|
| 4,400,770 A | * 8/1983 | Chan et al. ................... 711/3 |
| 4,785,398 A | 11/1988 | Joyce et al. ................... 711/3 |
| 5,003,459 A | 3/1991 | Ramanujan et al. ........... 711/3 |
| 5,276,851 A | 1/1994 | Thacker et al. ............. 711/120 |
| 5,386,547 A | 1/1995 | Jouppi ........................ 711/122 |
| 5,634,068 A | 5/1997 | Nishtala et al. ............. 711/141 |
| 5,668,968 A | * 9/1997 | Wu ............................... 711/3 |
| 6,006,312 A | * 12/1999 | Kohn et al. ................. 711/210 |
| 6,253,285 B1 | * 6/2001 | Razdan et al. ............. 711/118 |
| 6,477,635 B1 | * 11/2002 | Kahle et al. ................ 711/210 |
| 6,560,690 B2 | * 5/2003 | Hum et al. .................. 711/210 |
| 6,640,293 B1 | * 10/2003 | Paredes et al. ............. 711/210 |
| 2002/0007443 A1 | * 1/2002 | Gharachorloo et al. ..... 711/141 |

OTHER PUBLICATIONS

Barroso et al., "Piranha: A Scalable Architecture Based on Single–Chip Multiprocessing", In Proceedings of the 27th Annual International Symposium on Computer Architecture, Jun. 2000.

* cited by examiner

Primary Examiner—Donald Sparks
Assistant Examiner—Christian P. Chace

(57) ABSTRACT

L1 cache synonyms in a two-level cache system are detected and resolved by logic in the L2 cache. Duplicate copies of the L1 cache tags and state ("Dtags") are maintained in the L2 cache. After a miss occurs in the L1 cache, the Dtags in the second-level cache that correspond to all possible synonym locations in the L1 cache are searched for synonyms. If a synonym is found, the L2 cache notifies the L1 cache where the requested cache line can be found in the L1 cache. The L1 cache then copies the cache line from the location where the synonym was found to the location where the miss occurred, and it invalidates the cache line at the original location. The Dtags in the second-level cache are updated to reflect the changes made in the L1 cache.

15 Claims, 12 Drawing Sheets

For Direct Mapped L1 Cache:
Address Bit Groups = ABCD
Line Address = ABC
Tag = A
Cache Index for Line = BC
State = invalid, shared, clean_exclusive, dirty_exclusive For 2-way Set Associative Cache:
Address Bit Groups = ABCD
Line Address = ABC
Tag = AB
Cache Index for Line = C

METHOD AND SYSTEM FOR DETECTING AND RESOLVING VIRTUAL ADDRESS SYNONYMS IN A TWO-LEVEL CACHE HIERARCHY

This application is a continuation-in-part of U.S. patent application Ser. No. 09/878,982, filed Jun. 11, 2001, Scalabe Multiprocessor System And Cache Coherence Method, which claimed priority on U.S. provisional patent application serial No. 60/210,675, filed Jun. 10, 2000.

RELATED APPLICATIONS

This application is related to, and hereby incorporates by reference, the following U.S. patent applications:

Multiprocessor Cache Coherence System And Method in Which Processor Nodes And Input/output Nodes Are Equal Participants, Ser. No. 09/878,984, filed Jun. 11, 2001;

Scalable Multiprocessor System And Cache Coherence Method, Ser. No. 09/878,982, filed Jun. 11, 2001;

System and Method for Daisy Chaining Cache Invalidation Requests in a Shared-memory Multiprocessor System, Ser. No. 09/878,985, filed Jun. 11, 2001;

Cache Coherence Protocol Engine And Method For Processing Memory Transaction in Distinct Address Subsets During Interleaved Time Periods in a Multiprocessor System, Ser. No. 09/878,983, filed Jun. 11, 2001;

System And Method For Generating Cache Coherence Directory Entries And Error Correction Codes in a Multiprocessor System, Ser. No. 09/972,477, filed Oct. 5, 2001, which claims priority on U.S. provisional patent application 60/238,330, filed Oct. 5, 2000, which is also hereby incorporated by reference in its entirety.

FIELD OF INVENTION

The present invention relates generally to the design of cache memories in computer central processor units (CPU's), and particularly to the organization of two-level CPU caching systems in which the first-level cache is virtually indexed.

BACKGROUND OF THE INVENTION

The present invention is applicable to both single processor and multi-processor computer systems, but will be described primarily in the context of a distributed multi-processor system.

An "index position" within a cache identifies one or more cache lines within the cache. The number of cache lines stored at each index position is called the associativity of the cache. A direct mapped cache has an associativity of one. A two-way associative cache has an associativity of two, and thus has two cache lines at each index position of the cache.

A "memory line," also often called a cache line, is the basic unit of storage that is stored in a memory cache. A memory line or cache line is also the basic unit of storage that is tracked by the cache coherence logic in multi-processor computer systems. A memory line of data will often be called a "memory line" while it is stored in main memory or is in transit between system nodes, and the same data may also be called a cache line while it is stored in a memory cache.

When a first-level (L1) cache is virtually indexed the "cache index bits" within the virtual address supplied by a processor are used to retrieve a tag from a tag array within the cache. Virtual indexing of a first-level (L1) cache allows the lookup of the L1 cache tag to proceed concurrently with the translation of the requested virtual memory address into a physical memory address, sometimes herein called the targeted physical memory address. The virtual to physical address translation is performed by a translation look-aside buffer ("TLB"). The tag from the cache is then compared to the targeted physical memory address obtained from the TLB, and if there is a match and the cache state for the cache line is not "invalid" (which together indicate a cache hit), the data from the cache that corresponds to the tag is sent to the processor. If there is a miss, meaning that the retrieved tag did not match the physical address obtained from the TLB, the requested cache line of data must be obtained from a second-level cache or main memory.

While virtual indexing speeds up the lookup of a cache, it also may give rise to the possibility of synonyms. Synonyms are cache lines at different cache indices that map to the same physical memory address, and therefore refer to the same data entry. Synonyms may arise when a physical memory address is shared between two or more different programs or different parts of the same program, which may access it with two or more different virtual addresses. If the size of the cache divided by its associativity is greater than the size of the memory pages used in the system, a memory line at any given physical memory address can be stored at more than one index position within the cache. More specifically, the number N of cache line index positions at which any memory line may be found within the cache is equal to:

$$N = \frac{\text{cache size}}{\text{associativity} \times \text{pagesize}}$$

Having more than one cache index position correspond to the same physical memory address can give rise to a memory coherence problem if the data entry for one virtual memory address is changed without changing the data for another virtual memory address that maps to the same physical memory address. It is therefore necessary to either prevent synonyms from occurring or else to detect and resolve synonyms before they give rise to a memory coherence problem.

In addition, in the context of a shared memory multi-processor computer system with multiple first-level caches, it is also necessary to ensure that the cache coherence logic handling a request for a particular physical memory address be able to find any and all copies of the corresponding memory line, including those in first-level caches, even though there may be multiple L1 cache index positions at which the identified memory line may be stored within any particular L1 cache.

Since synonyms are only possible if the size of the first-level cache divided by its associativity is larger than the size of the system's memory pages, synonyms may be avoided by decreasing the size of the cache, increasing associativity, or increasing the size of the memory pages. Unfortunately, decreasing the size of the first-level cache reduces system performance, because it increases the number of cache misses. Increasing associativity greatly increase the complexity, and thus cost, of the L1 caches, and may also reduce system performance by increasing the time required retrieve a cache line from the L1 cache. Increasing the size of the system's memory pages is often not practical, because memory pages are the basic unit of memory used for many tasks, including memory allocation to processes, disk transfers and virtual memory management.

Alternatively, synonyms may be avoided at the system or kernel software level by restricting the assignment of virtual addresses by increasing the number of least significant address bits of the virtual addresses that must match the corresponding physical address. As a result of this restricted allocation of virtual addresses, all virtual addresses that correspond to a particular physical address will always have the same L1 cache index. This last method of avoiding synonyms places a burden on system software policies and on the usage of virtual address spaces.

A possible method of resolving the problem of L1 cache synonyms that was considered by the inventors, but rejected for reasons described next, is to build logic into the L1 cache for detecting synonyms and resolving them. When an L1 cache miss occurs, the logic would search for a synonym within the L1 cache and abort the miss if a synonym is found. The cache line would then be copied from the location where the synonym was found to the location where the miss occurred, and the cache line at the original location would be invalidated. The main disadvantage of this method is that it would cause the first-level cache to be kept busy after every cache miss, while the first-level cache is searched for synonyms. Most of the time a synonym will not be found, however, because synonyms are rare in practice. Searching the first-level cache for synonyms after every miss reduces system performance by increasing the amount of time between cache requests by the processor coupled to the L1 cache, and potentially reduces system performance by delaying the resolution of other subsequent L1 cache accesses. In addition, in multiprocessor systems, this technique may reduce system performance by decreasing the amount of time that the cache is available for responding to cache coherence protocol requests. The impact on system performance may be especially severe for processor cores that aggressively exploit instruction level parallelism and which therefore could tolerate the latency of a first-level cache miss. An additional disadvantage of searching the first-level cache for synonyms after a miss occurs is that it delays the initiation of the search of the second-level cache for the tag, unless the search of the second-level cache is done concurrently with the search of the first-level cache for synonyms. Searching the first-level and second-level caches concurrently requires a complex handshake between the first-level and second-level caches, because it introduces the need to abort the second-level search if a synonym is found in the first-level cache. The handshake is particularly difficult when several first-level caches share a single second-level cache, as is the case in some single chip multiprocessor ("CMP") systems.

SUMMARY OF THE INVENTION

L1 cache synonyms in a two-level cache memory system are detected and resolved using duplicate tags and detection logic in the second-level (L2) cache, rather than in the first-level (L1) cache. Duplicate copies of all the first-level cache tags and state ("Dtags") are maintained in the second-level cache. When a miss occurs in the first-level cache, an L1 miss message is sent to the L2 cache. The Dtags in the L2 cache that correspond to all possible synonym locations in the first-level cache are searched for a synonym of the requested cache line. By definition, a synonym of a requested cache line has the same physical address as the requested cache line, but is stored in at a different cache index of the L1 cache than the index corresponding to the specified virtual address of the cache line.

The L1 cache index is typically determined by a predefined subset of the cache line's virtual address bits. Furthermore one or more of the most significant bits of the L1 cache index are herein called the "vpn bits" of the virtual address. The number of vpn bits, M, is equal to:

$$M = \text{ceiling}\left(\text{Log}_2\left(\frac{\text{cache size}}{\text{associativity} \times \text{pagesize}}\right)\right)$$

where the "ceiling" function rounds up the value to which the ceiling function is applied to the closest integer if that value is not already an integer. The vpn bits of a virtual address identify which one of the possible N synonym cache index positions in the L1 cache corresponds to the virtual address. The other N-1 synonym cache index positions have the identical cache index value, except for the M most significant bits thereof.

The L1 cache miss request to the L2 cache specifies both the physical address of the requested cache line and the vpn bits of the specified virtual address so that the second-level cache can search the appropriate N-1 Dtag entries for a synonym having a tag matching the requested physical memory address but a different L1 cache index.

If a synonym is found, the second-level cache aborts the miss and notifies the first-level cache where the requested cache block can be found in the first-level cache. The first-level cache then copies the cache line from the location where the synonym was found to the location where the miss occurred, and it invalidates the cache line at the original location. Finally, the Dtags in the second-level cache are updated to reflect the changes made in the first-level cache.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

All specific quantities (such as numbers of processors, number of nodes, memory sizes, bit sizes of data structures, operating speeds of components, number of interfaces, number of memory locations in buffers, numbers of cache lines), as well as the sizes and number of components in various data structures, disclosed in this document, are provided solely for purposes of explaining the operation of one particular embodiment. These quantities will typically vary, sometimes significantly, from one implementation of the invention to another.

The following is a list of abbreviations frequently used in the descriptions below:

ECC: error correction code;
FSM: finite state machine;
ICS: intra-chip switch;
I/O: input/output;
L1 cache: first-level cache;
L2 cache: second-level cache;
MC: memory controller; and
PC: processor core.

Figure 1:
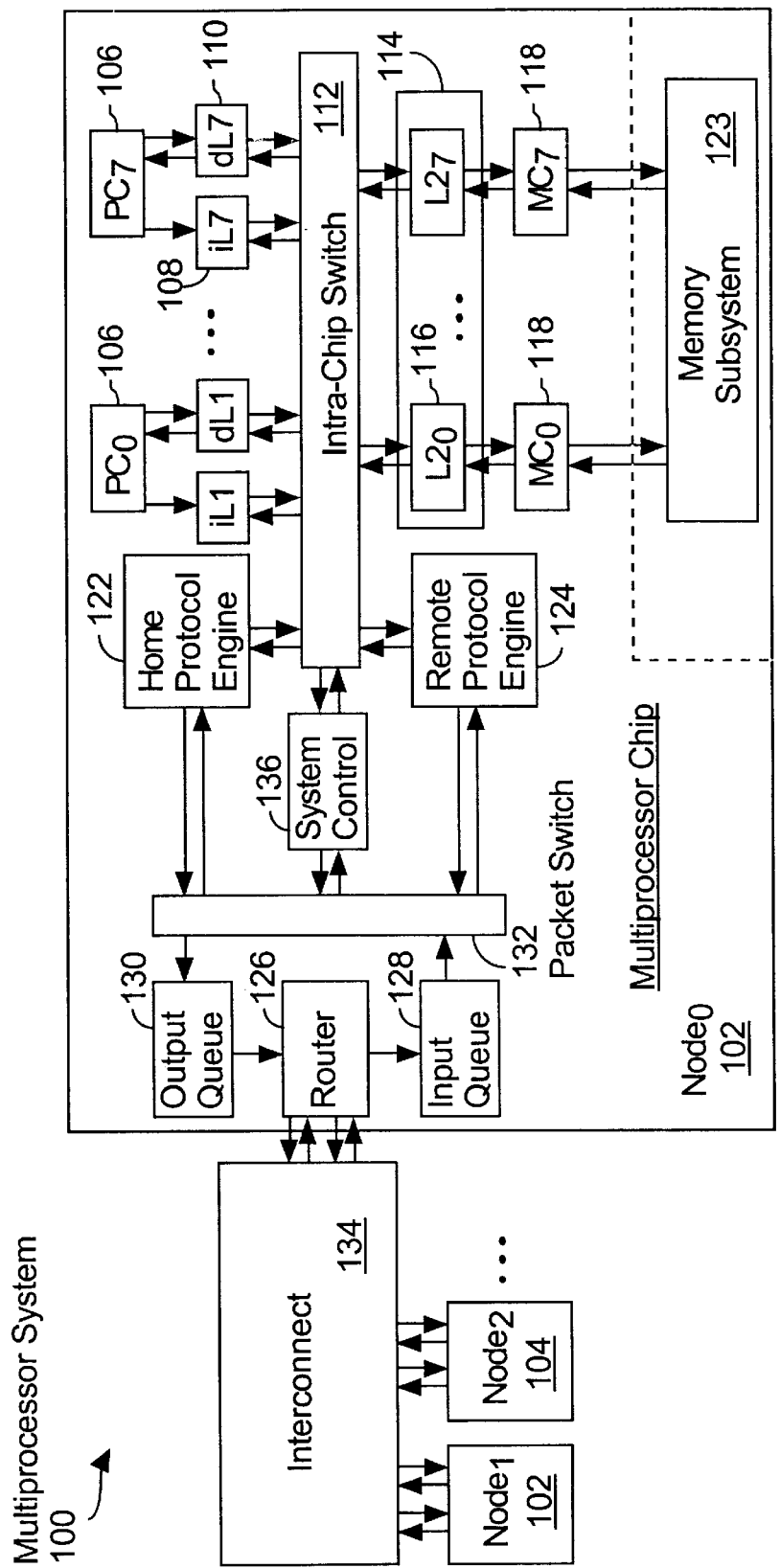
FIG. 1 is a block diagram of a multiprocessor system.

Referring to FIG. 1, there is shown a multiprocessor system 100 including a multiplicity of processor nodes 102 and input/output (I/O) nodes 104. Each processor node 102 is preferably implemented as a single chip multiprocessor. In a preferred embodiment, each processor node 102 has eight processor cores (PC) 106; however, other embodiments have two to sixteen PC's 106. The PC's 106, which may be comprised of a central processing unit, are processor cores since their caches, cache coherence logic and other supporting circuitry are shown separately.

Each processor core (PC) 106 is directly connected to dedicated instruction cache (iL1) 108 and data cache (dL1) 110 modules. These first-level caches (L1 cache modules) 108, 110 interface to other modules through an intra-chip switch (ICS) 112. Also connected to the ICS 112 is a logically shared second level cache (L2) 114 that is interleaved into eight separate modules 116, each with its own controller, on-chip tag, and data storage. Coupled to each L2 cache 116 is a memory controller (MC) 118 that preferably interfaces directly to a memory bank of dynamic random access memory (DRAM) chips (not shown) in a memory subsystem 123. In a preferred embodiment, each memory bank provides a bandwidth of 1.6 GB/sec, leading to an aggregate bandwidth of 12.8 GB/sec. Also connected to the ICS 112 are two protocol engines, the Home Protocol Engine 122 and the Remote Protocol Engine 124, which support shared memory across multiple nodes 102, 104 of the system. Multiple nodes are linked by a subsystem including a router 126, an input queue 128, an output queue 130, a packet switch 132, and an interconnect 134. The router 126 sends and receives packets to and from other nodes via the interconnect 134. The interconnect 134 physically links multiple nodes 102, 104. In a preferred embodiment the total interconnect bandwidth (in/out) for each node is 32 GB/sec. Finally, a system control module 136 takes care of miscellaneous maintenance-related functions (e.g., system configuration, initialization, interrupt distribution, exception handling, performance monitoring).

While the present invention is described in the context of a multi-processor, shared memory system, the present invention is also applicable to single processor computer systems.

Processor Core and First-Level Caches

In a preferred embodiment, each PC 106 uses a single-issue, in-order design capable of executing the Alpha instruction set. It consists of a 500 MHz pipelined datapath with hardware support for floating-point operations. The pipeline has 8 stages: instruction fetch, register-read, ALU 1 through 5, and write-back. The 5-stage ALU supports pipelined floating-point and multiply instructions. However, most instructions execute in a single cycle. The PC 106 includes several performance enhancing features including a branch target buffer, pre-compute logic for branch conditions, and a fully bypassed datapath. The PC 106 interfaces with separate first-level instruction and data caches designed for single-cycle latency.

As will be described in more detail below, the system uses 64 KB two-way set-associative, blocking caches with virtual indices and physical tags. The L1 cache modules 108, 110 include tag compare logic, instruction and data translation lookaside buffers (TLBs) and a store buffer (data cache only). The L1 cache modules 108, 110 also maintain a 2-bit state field per cache line, corresponding to the four states in a typical MESI protocol. For simplicity, the L1 instruction cache modules 108 and L1 data cache modules 110 use virtually the same design. Therefore, unlike other Alpha implementations, the instruction cache is kept coherent by hardware. Treating all cache modules 108, 110 in the same way also simplifies the implementation of a no-inclusion policy at the L2 level.

While a preferred embodiment is described with respect to a particular processor core, the present invention may be implemented using virtually any processor core or microprocessor.

Intra-Chip Switch

Figure 2:
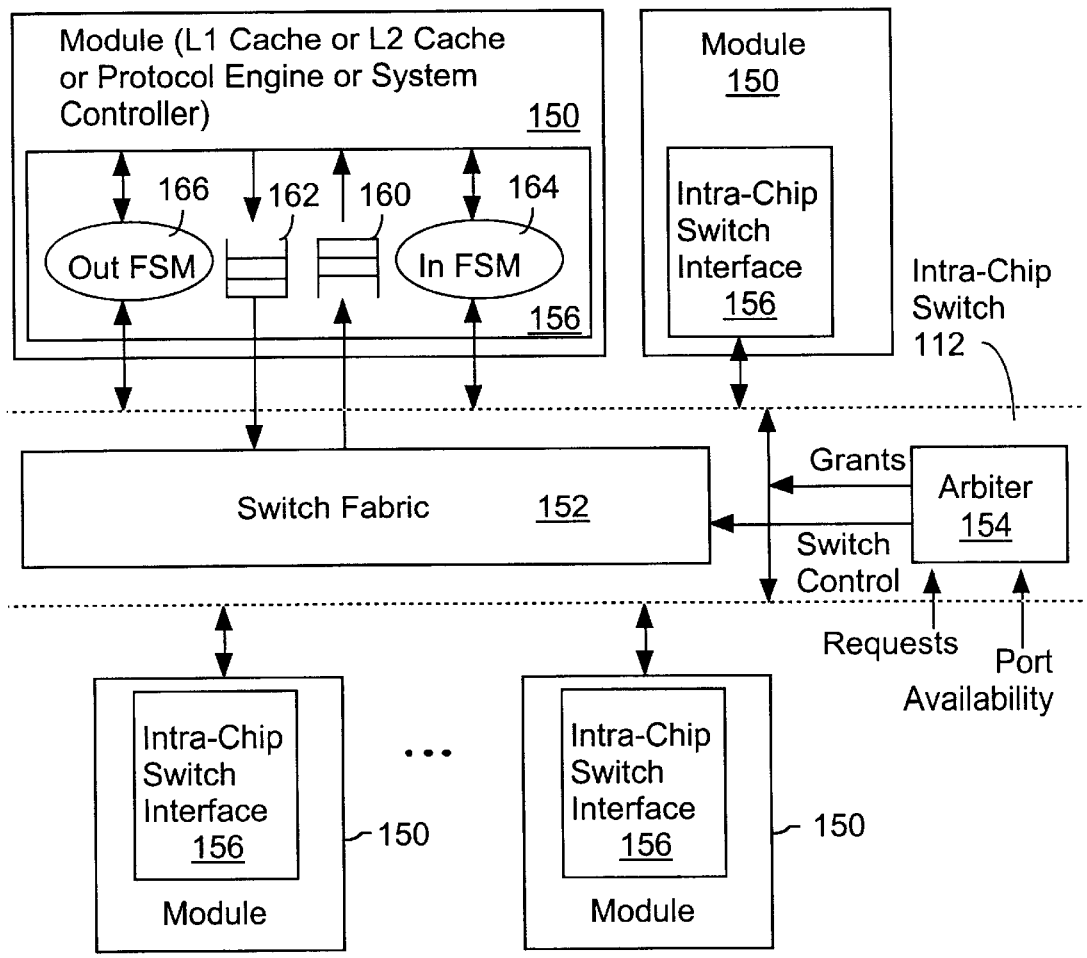
FIG. 2 is a block diagram of an intra-chip switch and the module interfaces used to couple the modules of a system node to the intra-chip switch.

Referring to FIG. 2, conceptually, the ICS 112 is a crossbar that inter-connects most of the modules 150 on a processor node 102 or I/O node 104. The ICS 112 includes a switch fabric 152 and an arbiter 154 for determining which data transfer(s) to handle during each available data transfer period. The length of the data period depends on the number of transfers required to send one cache line across the ICS 112. In a preferred embodiment, each connection provided by the switch fabric 152 of the ICS 112 has a path width of 64 data bits, plus eight parity bits, for a total of 72 bits. Each cache line transported through the ICS 112 has 512 bits of data and sixty-four parity bits. Memory lines are transported along with the corresponding sixty-four parity bits when they are transported through the ICS 112. Parity bits for memory lines are also sent to and used in the L1 cache arrays. However, parity bits are not used in the L2 cache and they are also not used in main memory. Instead, in the L2 cache, 20 error correction code (ECC) bits are associated with each memory line, and more specifically a 10-bit ECC is associated with each 256-bit half memory line. In the L2 cache and main memory, the 64 bits otherwise available for use as parity bits are used instead to store the 20 ECC bits, as well as a 44-bit directory entry, as described in more detail in related U.S. patent application Ser. No. 09/972,477, filed Oct. 5, 2001, System And Method For Generating Cache Coherence Directory Entries And Error Correction Codes in a Multiprocessor System. Data transfers generally are sent with a command or transaction type indicator, which is transferred in parallel with the first 64 bits of data of the cache line. Each cache line sized data transfer requires eight clock cycles, with 64 bits of data and a proportional share of the parity and ECC bits being transferred during each clock cycle.

Arbitration and flow control are handled by the arbiter 154. To better understand the arbiter it is helpful to first review the intra-chip switch interface 156 presented by each module 150 (i.e., L1 cache modules 108, 110, L2 cache, protocol engine or system controller) to the ICS 112. As shown in FIG. 2, the standard intra-chip switch interface 156 provided by each such module includes one or more input buffers 160, one or more output buffers 162, an input finite state machine (FSM) 164 for controlling use of the input buffer(s) 160, and an output finite state machine (FSM) 166 for controlling use of the output buffer(s) 162. The arbiter 154, via the FSM 164, 166 of each module 150 keeps track of the availability of buffer space in the input buffers 169 of the modules 150 at all times, and exercises flow control by deferring requests to transfer data to modules with full input buffers 160. The arbiter 154 also receives all intra-chip data transfer requests from the intra-chip switch interfaces 156 of the modules 150, and arbitrates between the requests whose destinations have input buffers 160 with sufficient room to receive a data transfer (i.e., a cache line of data).

In a preferred embodiment three parallel communication lanes, also called queues, are implemented in the input buffers 160 and output buffers 162 of the ICS interface 156, as well as in the input and output buffers of interfaces (not shown) to the packet switch 126 and interconnect 134 (see FIG. 1). These lanes or queues are labeled I/O, low priority and high priority, respectively. The high priority queues in the input and output buffers are used to store messages sent from a home node to another node of the system, replies from third party nodes to the home node or the requester node for a particular transaction, and messages internal to a node. The low priority queues are used to store messages going to the home node for a particular transaction. The low priority message are thus messages for initiating new memory transactions, while the high priority messages are messages for completing previously initiated memory transactions. The I/O queues are used for handling requests being sent to I/O devices. The messages in the I/O queues are given the lowest priority by the ICS 112 and also by the packet switch 126 and interconnect 134 (see FIG. 1).

The use of multiple communication lanes generally increases the size of the input and output buffers in the interfaces to the ICS 112, packet switch 126 and interconnect 134. However, the use of multiple communication lanes is important to avoid deadlock conditions in the network, and in particular for ensuring that active memory transactions make forward progress even when the system is experiencing high levels of protocol message traffic. In alternate embodiments, four or more communication lanes are used instead of three. In particular, in one alternate embodiment the high priority lane is replaced by two separate communication lanes, one for messages sent from the home node of a memory transaction and the other for replies sent by third parties to either the home node or any other node in the system. Providing the additional communication lane helps to ensure that messages sent by the home nodes of transactions are not blocked by reply messages being sent by the same node(s) for transactions in which those nodes are not the home node, and vice versa.

From a philosophical viewpoint, the ICS 112 is the primary facility for decomposing the processor node 102 and I/O node 104 into relatively independent, isolated modules 150. For instance, the transactional nature of the ICS 112 and the uniformity of the interfaces 156 presented by the modules 150 to the ICS 112 together allow different types of modules 150 to have different numbers of internal pipeline stages for handling various type of memory transactions.

The ICS 112 uses a unidirectional, push-only data transfer technique. The initiator of a memory transaction always sources data. If the destination of a transaction is ready, the arbiter 154 schedules the data transfer according to datapath availability. A grant is issued by the arbiter 154 to the initiator of the transaction to commence the data transfer at a rate of one 64-bit word per cycle without any further flow control. Concurrently, the destination receives a signal from the arbiter 154 that identifies the initiator and the type of transfer. Transfers across the ICS 112 are atomic operations.

Each port to the ICS 112 consists of two independent 64-bit data paths (plus additional datapath bits for eight parity bits) for sending and receiving data. The ICS 112 supports back-to-back transfers without dead-cycles between transfers. In order to reduce latency, in a preferred embodiment the modules 150 are allowed to issue a "prerequest" indicating the target destination of a future request, ahead of the actual transfer request. The pre-request is used by the ICS 112 to pre-allocate data paths and to speculatively assert a grant signal to the requester.

L1 Cache

Figure 3A:
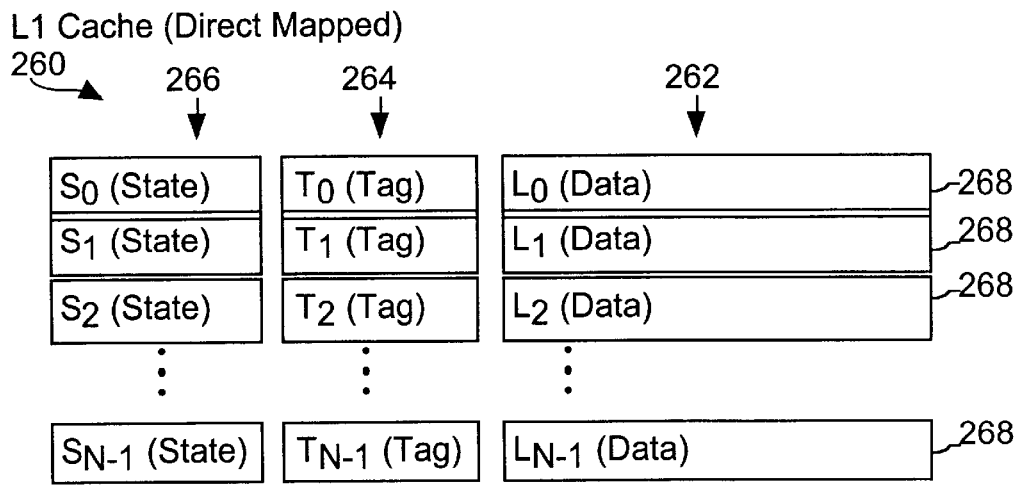
FIGS. 3A and 3B depict two embodiments of the Tag-State and Data arrays of an L1 cache.

Referring to FIG. 3A, a direct mapped version of the L1 cache 260 will be explained before explaining a two-way set associative version, shown in FIG. 3B. Each L1 cache 260, whether it is a data or instruction cache (see FIG. 1) includes a data array 262 for storing cache lines, a tag array 264 and a state array 266. Each entry 268 of the L1 cache 260 includes a cache line, a tag and a state value. The cache line consists of the data from one memory line, and in a preferred embodiment this consists of 64 bytes (512 bits) of data plus parity and ECC bits corresponding to the 64 bytes.

The tag of each entry 268 consists of the address bits required to uniquely identify the cache line, if any, stored in the entry. Each address used to access memory consists of a string of address bits, ABCD, where A, B, C and D each consist of different groups of the address bits. The D bits are used to identify specific words (or bits, or bytes, depending on the implementation) within the cache line. The B and C bits, herein called BC, identify the entry 268 into which the memory line at address ABC0 is stored within the L1 cache. The BC bits are called the index or cache index of the address. The L1 cache contains a set of cache lines at every possible value of the cache index. In a direct-mapped cache only one cache line is mapped to each cache index, but in a set associative cache (e.g., a 2-way or 4-way set associative cache) multiple cache lines (e.g., 2 or 4 cache lines) are mapped to each cache index. The A bits comprise the tag of the cache line, which together with the cache index (the BC bits) uniquely identify the memory line.

In a preferred embodiment of this invention, the L1 cache is "virtually indexed", rather than being indexed by physical address. In a virtually indexed cache, the virtual address is used to determine the cache index for the cache line at a specified virtual address.

An "index position" within a cache identifies one or more cache lines within the cache. The number of cache lines stored at each index position is called the associativity of the cache. A direct mapped cache has an associativity of one. A two-way associative cache has an associativity of two, and thus has two cache lines at each index position of the cache. The "index position" is often called the "cache index".

Virtual indexing of the first-level (L1) cache allows the lookup of the L1 cache tag to proceed concurrently with the translation of the requested virtual memory address into a physical memory address. The L1 cache tag for a specified virtual address is the physical address of the memory line, if any, stored at the cache index, which is derived from the address bits of the virtual address. Virtual indexing of the L1 cache improves the speed at which data can be retrieved from the L1 cache, compared to indexing of the cache with physical addresses, because data retrieval from the cache's data array can start without waiting for translation of the virtual address into a physical address.

The virtual to physical address translation is performed by a translation look-aside buffer ("TLB"). The tag from the cache is then compared to the physical memory address obtained from the TLB, and if there is a match (representing a cache hit), the data from the cache that corresponds to the tag is sent to the processor. If there is a miss, meaning that the retrieved tag did not match the physical address obtained from the TLB, the requested cache line of data must be obtained from a second-level cache or main memory.

While virtual indexing speeds up the lookup of a cache, it may also give rise to the possibility of synonyms. Synonyms are cache lines at different cache indices that map to the same physical memory address, and therefore refer to the same data entry. Synonyms may arise when a memory line is shared by two or more different programs, or different parts of the same program, which access it using two or more different virtual addresses. If the size of the cache divided by its associativity is greater than the size of the memory pages used in the system, the cache line at any given physical memory address can be stored at more than one index position within the cache. More specifically, the number N of index positions at which any cache line may be found within the cache is equal to:

$$N = \frac{\text{cache size}}{\text{associativity} \times \text{pagesize}}$$

Having more than one cache index position correspond to the same physical memory address can give rise to a memory coherence problem if the data at one virtual memory address is changed without changing the data for another virtual memory address that maps to the same physical memory address. It is therefore necessary to either prevent synonyms from occurring or else to detect and resolve synonyms before they give rise to a memory coherence problem.

In addition, in the context of a shared memory multi-processor computer system with multiple first-level caches, it is also necessary to ensure that the cache coherence logic handling a request for a particular physical memory address be able to find any and all copies of the corresponding cache line, including those in first-level caches, even though there may be multiple L1 cache index positions at which the identified cache line may be stored within any particular L1 cache.

In one embodiment, the state of each L1 cache entry 268 is represented by two bits, which for each cache line represent one of four predefined states:

invalid, which means that the cache entry 268 is empty, or that the data in it is invalid and should not be used;

shared, which means that other processors or other nodes in the system have non-exclusive copies of the same memory line as the one stored in the cache entry;

clean_exclusive, which means that this L1 cache has the only copy of the associated memory line, has been allocated exclusive use thereof, and that the value of the cache line has not been changed by the processor coupled to the L1 cache; and dirty_exclusive, which means that this L1 cache has the only copy of the associated memory line, has been allocated exclusive use thereof, and that the value of the cache line has changed by the processor coupled to the L1 cache.

Figure 3B:
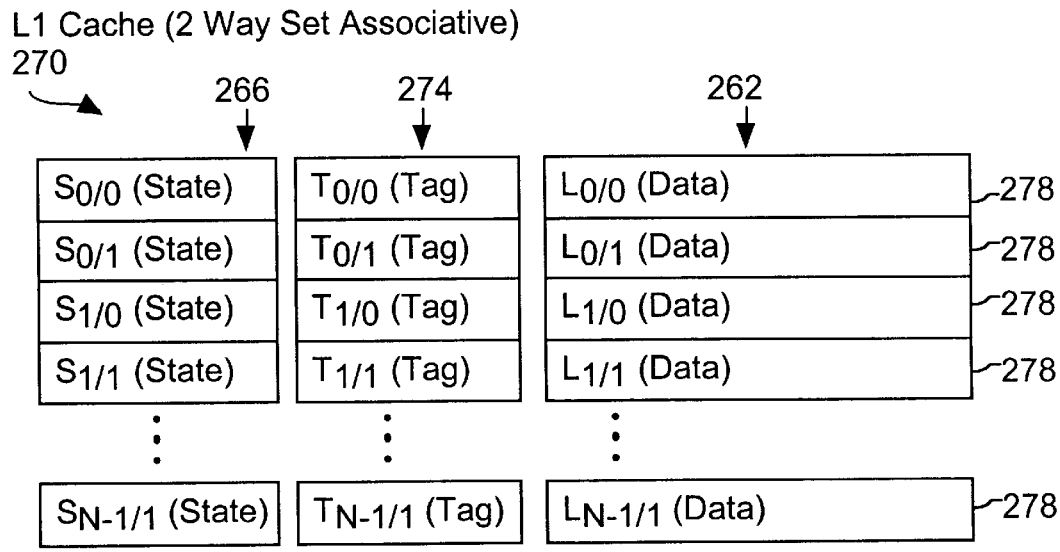

Referring to FIG. 3B, there is shown a two-way associative version of the L1 cache, which may be used in an alternative implementation. Only the differences between the L1 caches of FIGS. 3A and 3B will be described. In particular, the set associative L1 cache 270 has the same number of entries 278 as the direct mapped L1 cache 260, but in this version two cache lines are mapped to each cache index instead of just one. As a result, there are only half as many cache index values, and therefore the cache index is represented by just the C bits of the ABCD address bits. In this embodiment of the L1 cache, the B address bit of each memory line address is included in the tag of the entry, and thus the tag array 274 is one bit wider in this embodiment than in the direct mapped L1 cache embodiment. If the L1 cache were a four-way associative cache, the tag array 274 would be two bits wider than in the direct mapped L1 cache embodiment. A two-way associative L1 cache may be preferred over a direct mapped cache because it reduces cache evictions caused by cache index conflicts. On the other hand, set associative caches require the use of significantly more complicated circuitry than direct mapped caches.

While the remaining portions of the description of the preferred embodiments assume that the L1 cache is a direct mapped cache, the present invention is equally applicable to set associative L1 caches.

L1 Data Paths and Control Logic

Figure 4:
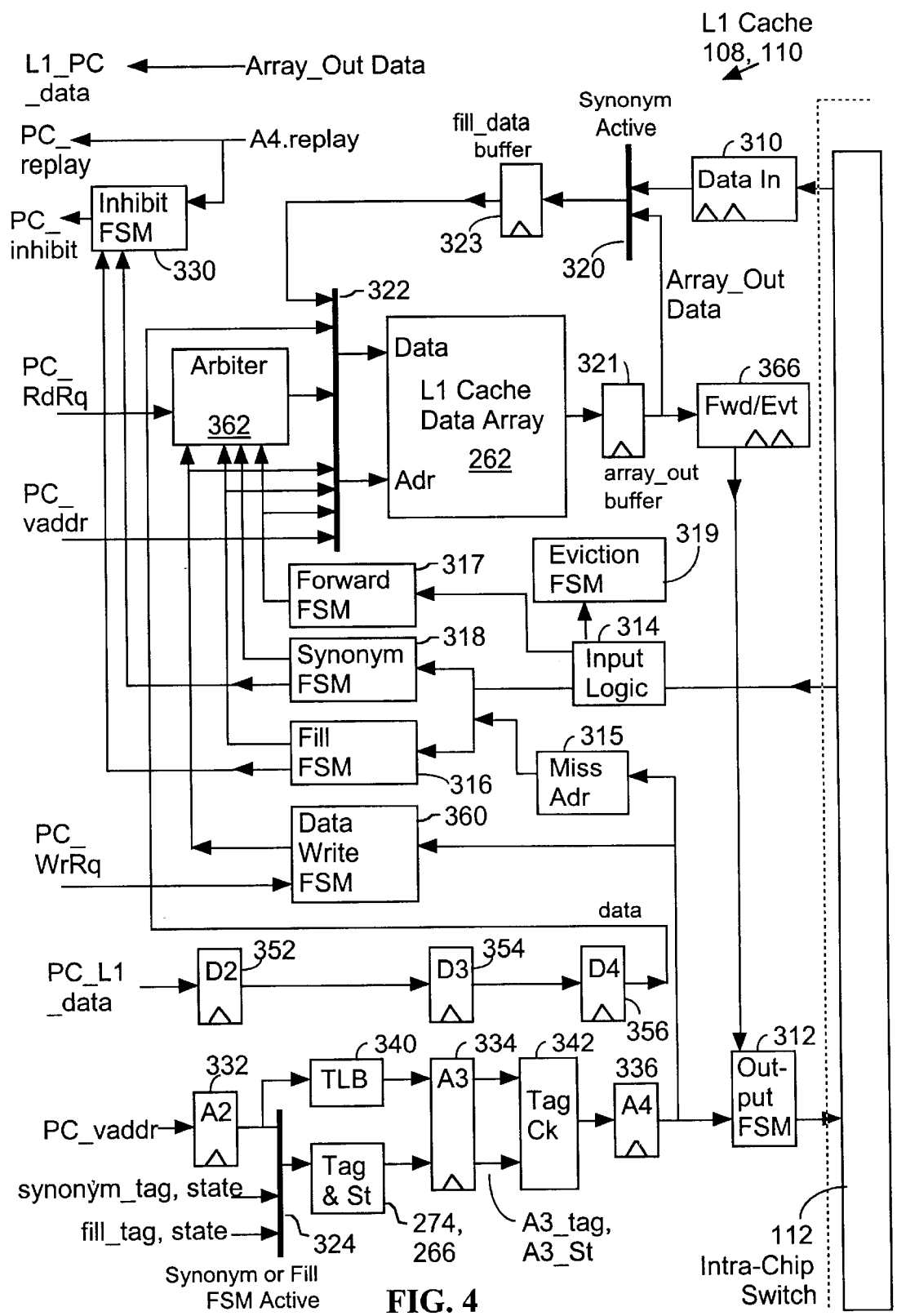
FIG. 4 shows the architecture of the L1 cache.

FIG. 4 shows the data paths and primary components of the L1 cache 108, 110. Some of the connections between the various finite state machines of the L1 cache and some of the connections between those finite state machines, the tag and state arrays 274, 266 and other components of the L1 cache 108, 110 that are described below are not shown in FIG. 4 in order to avoid undue cluttering of this figure.

The L1 cache receives data (PC_L1_data) and a virtual address (PC_vaddr) from the processor core (PC) coupled to the L1 cache. Other signals received by the L1 cache from the PC are a read request signal (PC_RdRq), which signals that the PC is requesting data from the L1 cache, and a write request (PC_WrRq), which signals that the PC is requesting to write data into the L1 cache. The signals sent by the L1 cache to the PC include data output by the L1 cache (L1_PC_data), a replay signal (PC_replay) requiring the processor to retry the last request sent by the PC to the L1 cache, and an inhibit signal (PC_inhibit) to inform the PC to inhibit its memory accesses because the L1 cache is busy (e.g., servicing a cache miss).

The L1 cache receives data from and sends data to the L2 cache, main memory, and other devices via the intra-chip switch 112. Received data is temporarily buffered by a data in buffer 310, and data being sent elsewhere is output via an output finite state machine (Output FSM) 312. The output buffer for sourcing data to the ICS 112 is called the Fwd/Evt buffer 366.

Input logic 314 receives control signals sent via the ICS 112 and conveys those control signals to a fill FSM 316, a forward FSM 317, a synonym FSM 318, and/or an eviction FSM 319. The fill FSM 316 controls the loading of a cache line received from the ICS 112 into the L1 cache data array 262. The forward FSM 317 controls the forwarding of a cache line, at the request of a device elsewhere in the system, via the ICS 112. For instance, a protocol engine in the same node as the L1 cache may send a request to the L1 cache to forward a copy of a specified cache line to the protocol engine, which will may then forward the cache line to another node in the system or to another L1 cache in the same node of the system as the L1 cache sourcing the cache line. The eviction FSM 319 controls the eviction of a cache line from the L1 cache. The eviction FSM 319 sends a copy of an evicted cache line to the L2 cache, but does not invalidate or otherwise modify the tag of the evicted cache line. A line is only evicted when it is the target of a miss request. An eviction is therefore always preceded by a fill operation, and the line's tag is updated as part of that fill operation.

The synonym FSM 318 controls the movement of a cache line from one L1 cache slot to another when the L2 cache instructs the L1 cache to do so. Multiplexer 320 routes cached data from a slot of the L1 cache data array 262 back to the data array input multiplexer 322 under the control of the synonym FSM 318. Input and output staging buffers 321, 323 are preferably used in this data path, for instance to facilitate delivery of successive portions of the data in a cache line over the data path.

When the synonym FSM 318 is not active, multiplexer 320 sources data from the data input buffer 310 to the data array input multiplexer 322. A synonym is detected when the virtual index derived from a virtual address does not match the physical location of a cache line in the L1 cache. As is more fully explained below, a cache line is then copied from one L1 cache slot to another. A tag information input multiplexer 324 is also controlled by the synonym FSM 318 to enable tag and state information for the L1 tag and state arrays 274, 266 to be sourced by the synonym FSM 318 when the synonym FSM 318 is activated. When the fill FSM 316 is active, tag and state information are sourced by the fill FSM 316 and that information is conveyed by the tag information input multiplexer 324 to update the tag and state arrays 274, 266. When neither the fill FSM 316 nor the synonym FSM 318 are active, the tag information input multiplexer 324 sources tag information for the L1 tag array 274 from the virtual address (PC_vaddr) provided by the PC.

An inhibit FSM 330 receives signals from the fill FSM 316 and synonym FSM 318 when those finite state machines are activated and sources the PC_inhibit signal to the processor core while either of these finite state machines is servicing a cache fill or synonym cache line relocation operation. The PC_inhibit signal instructs the processor core to not send any further cache access requests until the PC_inhibit signal is deactivated.

When the processor core sends either a read or write request to the L1 cache, the processor core provides a virtual address, PC_vaddr. The virtual address and information derived from it, such as a valid tag match signal, are stored in a series of staging buffers 332, 334, 336.

Additional staging buffers, beyond those shown in FIG. 4, may be required in some implementations. The virtual address is translated into a physical address (PA) by a translation lookaside buffer (TLB) 340 at the same time that a tag and state lookup is performed by the tag and state arrays 274, 266. The resulting physical address and tag lookup results are stored in a second staging buffer 334 and are then conveyed to a tag checking circuit 342 that determines if there is a tag match for a valid cache line.

The tag checking circuit 342 includes a comparator that compares the address tag read from a cache line and the physical address output by the TLB. The tag checking circuit 342 also checks the state of the cache line, represented by a two-bit state field in the preferred embodiment. If the state of the cache line is "invalid," the address tag read from the cache line is logically treated as a null value that cannot match any physical address output by the TLB. When the address tag read from the cache line and the physical address output by the TLB match, and the state of the cache line is not "invalid," the tag checking circuit 342 outputs a signal indicating a "hit", and otherwise it outputs a signal indicating a "miss."

The results of the tag check, which includes state information as well as tag match information and the virtual address being checked, are stored in yet another staging buffer 336. The information in the staging buffer 336 is conveyed to a data write FSM 360 when a valid match is found, and is conveyed to the output FSM 312 when a cache miss is detected. When a cache miss is detected, the virtual address (or at least the virtual cache index portion of the virtual address) in staging buffer 336 is stored in the Miss Address buffer 315 for later use by either the Synonym FSM 318 or the Fill FSM 316. Both of these FSM's 316, 318 use the virtual address information in the Miss Address buffer 315 to control the location into which data, tag and state information are written into the L1 data, tag and state arrays 262, 274, 266, when the cache miss is resolved. In one embodiment, the physical address output by the TLB 340 is also stored in the staging buffer 336 and Miss Address buffer 315, and only VPN bits of the virtual address are stored in these buffers 336, 315. Storing the physical address in these buffers eliminates the need to include the physical address in miss and synonym replies by the L2 cache.

The final staging buffer 336 also stores a "replay" signal, generated by the tag checking circuit 342, and the replay signal is conveyed to the processor core to indicate whether the L1 read or write operation requested by the processor core must be resubmitted to the L1 cache after the PC_inhibit signal is deactivated.

When a data write is being performed, the write request signal (PC_WrRq) and the results of the tag lookup are used by a data write FSM 360 and a cache access Arbiter 362 to determine if (and when) the data sourced by the processor core is to be written into the L1 cache data array 262. The data sourced by the processor core is buffered in a series of staging buffers 352, 354, 356 so that the data to be written is available at the data array input multiplexer 322 at the same time that the tag check results become available to the data write FSM 360. The data write FSM 360 stalls the data pipeline 352, 354, 356 if the arbiter 362 determines that the L1 cache is not ready to store the sourced data into the L1 cache data array 262.

When a data read is being performed, the read request signal (PC_RdRq) is received directly by the arbiter 362 and the virtual address is used to directly read a cache line in the L1 cache data array 262 even before the results of the tag lookup and check are ready. The data read from the data array is temporarily buffered in the array_out buffer 321 and is discarded if a cache miss is detected. If the read data is being read in response to a processor core (PC) request and a cache hit is detected, the read data is sourced from the array_out buffer 321 to the PC via the data path labeled Array_Out Data (L1_PC_data). If the read data is being read in response to a request received via the intra-chip switch (ICS) 112, the read data is sourced from the array_out buffer 321 to the Fwd/Evt buffer 366, and from there it is conveyed to the output FSM 312 for transmission to the requesting device via the ICS 112.

L2 Cache with Duplicate L1 Tags

Figure 5A:
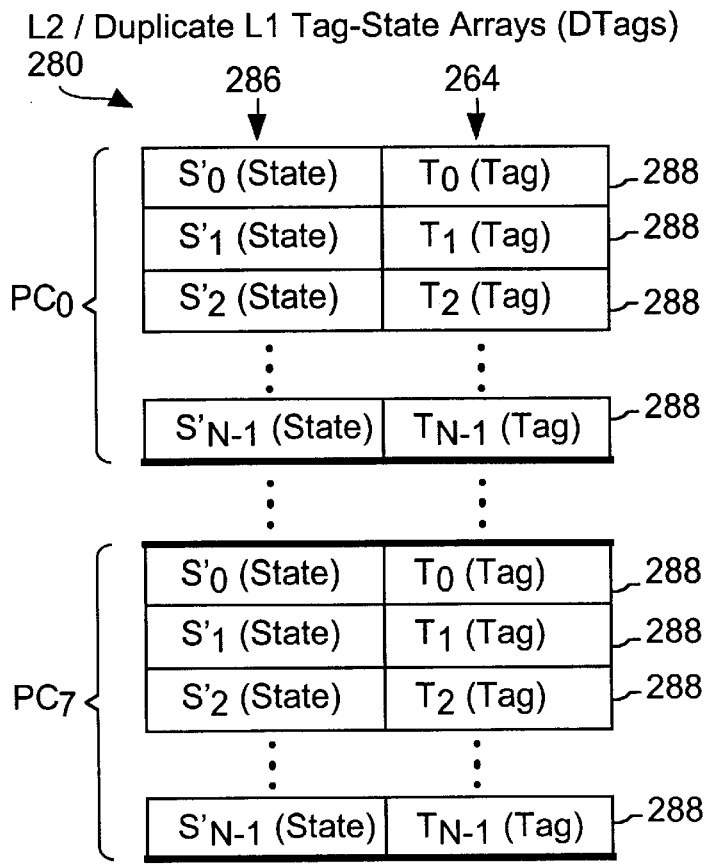
FIGS. 5A and 5B depict the duplicate tag, tag-state and data arrays of an L2 cache.

Referring to FIG. 5A, the L2 cache includes a set of "duplicate L1 tag and state arrays" 280 for a direct mapped L1 cache. These "Dtag" (duplicate tag) arrays 280 contain exact copies of the tag arrays of all the L1 caches in the same node as the L2 cache, and furthermore contain state information that is similar to, but not identical, to the state information in the L1 cache state arrays 266 (FIG. 3A). Thus, each entry 288 of the Dtag arrays 280 corresponds to exactly one of the L1 cache entries 268 in the L1 caches of the node. The relationship between the state information in the L1 cache, the state information in the Dtag arrays 280 of the L2 cache, and the state information in the L2 cache (see FIG. 5B) is as follows:

| L1 state | Dtag-L1 state | Possible corresponding L2 states |
|---|---|---|
| invalid | invalid | invalid, clean, clean_nodex, dirty |
| shared | shared_clean | invalid, clean, clean_nodex, dirty |
| | shared_clean_owner | invalid |
| | shared_clean_owner_nodex | invalid |
| | shared_dirty | invalid |
| clean_exclusive | exclusive | invalid |
| dirty_exclusive | | invalid |

As shown in the above table, the L2 cache keeps additional information in the Dtag arrays regarding the ownership of shared cache lines. For instance, the shared_clean_owner_nodex state for any particular cache line indicates that the cache line in the L1 cache has not been modified, and that this node is the exclusive owner of the cache line. The clean_nodex state in the L2 cache means the same thing.

An L1 cache line with a Dtag state of exclusive, shared_dirty, shared_clean_owner or shared_clean_owner_nodex is the owner of the cache line. If the L2 cache has a valid copy of the cache line, it is the owner of the cache line, and the only possible Dtag states for that cache line are invalid or shared_clean. An L1 cache always performs a write-back when it replaces a cache line of which it is the owner. The written back cache line is loaded into the L2 cache, possibly victimizing another L2 cache line.

The L1 cache owner of a cache line responds to other L1 misses on the same cache line. In this case the requester of the cache line become the new owner and the previous owner's Dtag state for the cache line is changed to shared_clean.

If a cache line is present in a particular node, node-exclusive information is kept in either the L2 state or the Dtag state of the owner L1 cache. The L2 states clean_nodex and dirty, and the Dtag states shared_clean_owner_nodex, shared_dirty and exclusive all indicate that the node is the only node in the system that is caching the identified memory line (i.e. identified by the tag and cache index of the cache line). In a preferred embodiment, dirty (i.e., modified) cache lines are never shared across nodes. Thus, if a node has a cache line that has been modified with respect to the memory copy, no other node in the system can have a copy of the line. As a result, when a node requests a shared copy of a cache line that has been modified by another node, the memory transaction that satisfies the request will always write-back the modified data to memory. Within a single node, however, a preferred embodiment allows sharing of a modified cache line among the processor cores. In this case, the Dtag state of the L1 owner is set to shared_dirty and any other sharers have their Dtag state set to shared_clean.

While the Dtag arrays 280 preferably contain only the tag arrays and state information for the L1 cache lines, in other embodiments they also may contain all the information (i.e., including the data from the cache lines) in the L1 cache.

Figure 5B:
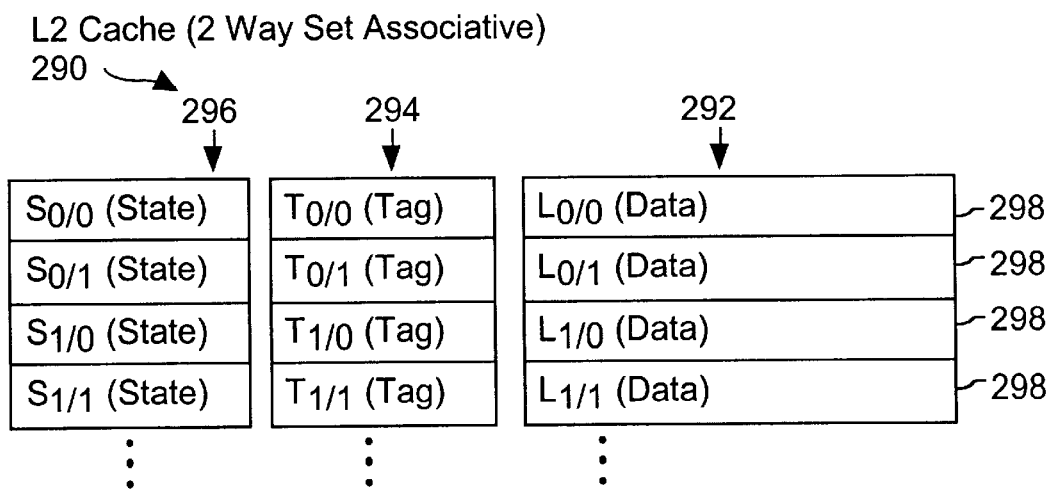

Referring to FIG. 5B, the main L2 cache array 290 includes a data array 292 for storing cache lines, a tag array 294 and a state array 296. The L2 cache array is preferably distributed across eight interleaved arrays, but for purposes of this explanation, the interleaved array structure is not shown, as it does not affect the logical organization and operation of the L2 cache. Each entry 298 of the L2 cache 290 includes a cache line, a tag and a state value. The cache line consists of the data from one memory line, and in a preferred embodiment, this consists of 64 bytes (512 bits) of data plus parity and ECC bits corresponding to the 64 bytes.

The tag of each entry 298 consists of the address bits required to uniquely identify the cache line, if any, stored in the entry. Because the L2 cache is typically much larger than the L1 caches, a different subset of the address bits of a memory line address is used to identify the cache index and a different subset of the address bits is used as the tag compared with the address bits used for those purposes in the L1 caches.

The L2, cache line state value for each L2 cache entry is selected from among the following state values:

invalid, which means that the cache entry 298 is empty, or that the data in it is invalid and should not be used;

clean, which means that the value of the memory line has not been changed and is therefore the same as the copy in main memory, and furthermore means that copies of the cache line may be stored in (A) one or more of the L1 caches of the same node as the L2 cache and/or (B) the L1 or L2 caches in other nodes of the system, and that these copies are non-exclusive copies of the same memory line as the one stored in the L2 cache entry;

clean_nodex (clean node-exclusive), which means that the L2 cache has a clean copy of the associated memory line (i.e., the memory line has not been changed and is the same as the copy in main memory), and that there may be cached copies of this memory line in local L1 caches in the same node as the L2 cache, but there are no copies of the memory line in any other nodes of the system; and dirty, which means that this L2 cache has the only copy of the associated memory line, and that the value of the cache line has been changed by one of the processor cores coupled to the L2 cache.

L2 Data Paths and Control Logic

Figure 6:
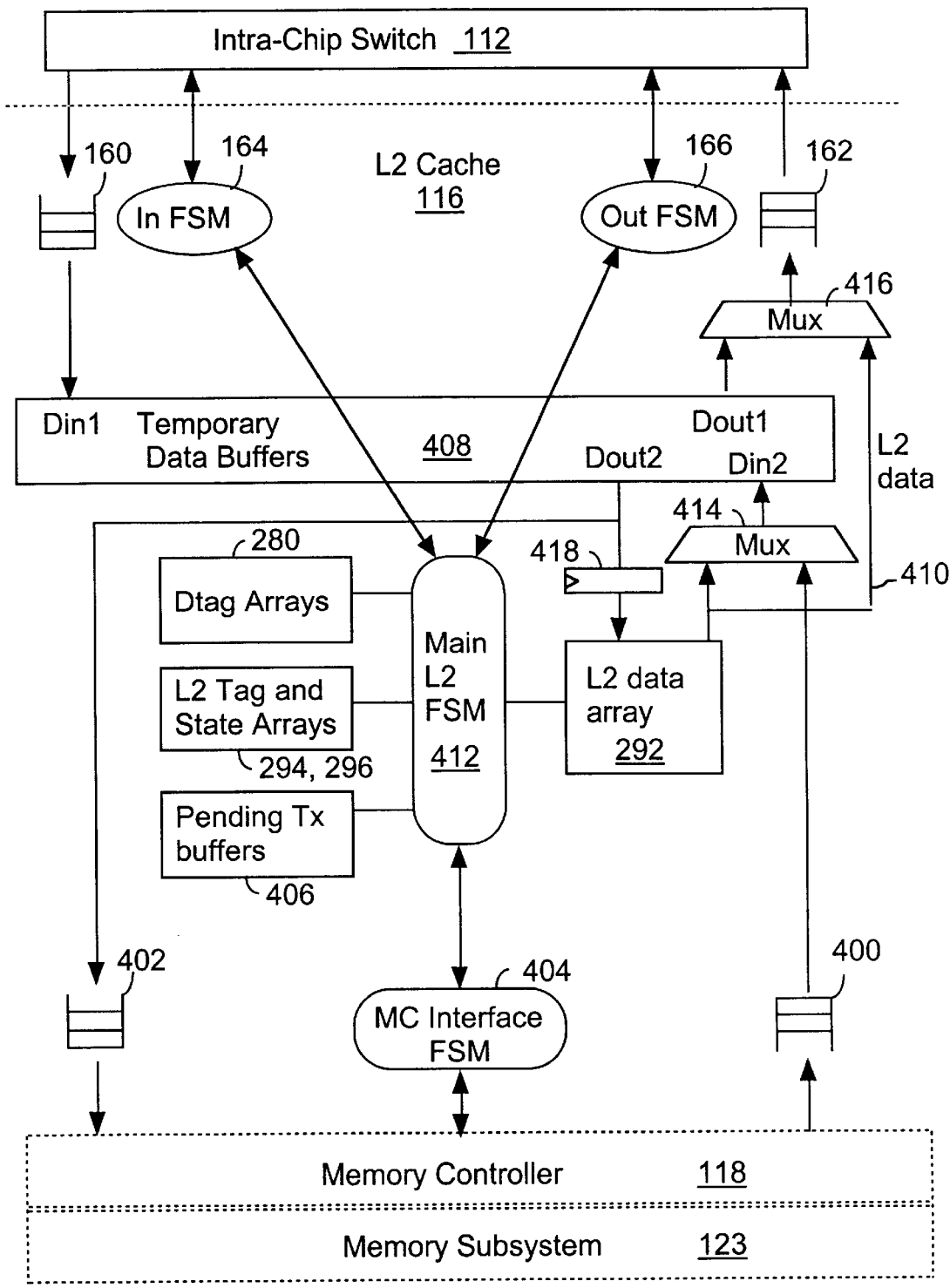
FIG. 6 shows the architecture of the L2 cache.

FIG. 6 shows the data paths and primary components of the L2 cache 116. As described earlier with respect to FIG. 3, the L2 cache has an interface to the intra-chip switch 112. This interface includes one or more input buffers 160, one or more output buffers 162, an input finite state machine (In FSM) 164 for controlling use of the input buffer(s) 160, and an output finite state machine (Out FSM) 166 for controlling use of the output buffer(s) 162. Similarly, the L2 cache 116 has an interface to the memory controller 118 (see also FIG. 1) that includes one or more input buffers 400, one or more output buffers 402 and a memory controller interface finite state machine (MC interface FSM) 404 for controlling the use of the MC interface input and output buffers 400, 402.

A set of pending buffers 406 are used to store status information about memory transactions pending in the L2 cache. For instance, the pending buffers 406 keep track of requests made to the memory subsystem (see FIG. 1) via the memory controller 118. A set of temporary data buffers 408 are used to temporarily store cache line data associated with pending memory transactions, including data being sourced to the L2 cache, data sourced from the L2 cache, and data transported through the L2 cache (i.e., from the memory subsystem 123 to the L1 cache). Data sent by the L2 cache in response to an L1 cache miss bypasses the temporary data buffers 408 and is sent via a bypass data path 410 so as to reduce latency when the L2 cache contains the data needed to satisfy a cache miss in an L1 cache (which is coupled to the L2 cache via the ICS 112).

The duplicate tag (Dtag) arrays 280 and L2 tag and state arrays 294, 296 have been discussed above with reference to FIGS. 5A and 5B. Access to and updating of these arrays is handled by the main L2 finite state machine 412. The main L2 FSM 412 includes Dtag and tag lookup, Dtag and tag checking, and Dtag, tag and state updating logic.

When an L1 cache miss is serviced by the L2 cache 116, a synonym copy is not found using the information in the Dtag arrays 280 and the L2 cache does not have a cached copy of the memory line required by the L1 cache, the request is forwarded to the memory subsystem 123 via the MC interface FSM 404. The memory line of information provided by the reply from the memory subsystem 123 is not stored in the L2 cache 116. Instead the memory line is sent directly to the L1 cache, bypassing the L2 data array 292. More specifically, the reply from the memory subsystem is directed through multiplexer 414 to the Din2 input port of the temporary data buffers 408. The reply is then output at the Dout1 port of the temporary data buffers 408 to the interface output buffer 162 via output multiplexer 416.

When an L1 cache evicts a memory line from the L1 cache, the victim memory line is sent to the L2 cache for storage via the ICS 112 and the interface input buffer 160. The victim memory line is received at the Din1 input port of the temporary data buffers 408 and temporarily stored therein. The victim memory line is then sent from the temporary data buffers 408 to the L2 data array 292, via the Dout2 port of the temporary data buffers 408 and a staging buffer 418, for storage in the L2 data array 292.

When the L2 cache sources a memory line to an L1 cache, the memory line read from the L2 data array 292 is conveyed via bypass line 410 to output multiplexer 416, and from there to the ICS interface output buffer 162. The output FSM 166 handles the transfer of the memory line from the output buffer 162 to the ICS 112, and from there it is sent to the L1 cache.

Duplicate tags (Dtags) are used by the L2 cache to determine which L1 caches have cached copies of an identified memory line. The duplicate tags in the Dtag arrays 280 are accessed by the main L2 FSM 412, and information derived from the duplicate tags is used to send messages via the output FSM 166 to one or more of the L1 caches in the same node as the L2 cache, or to other components of the node.

Locating Synonyms in the Dtags of the L2 Cache

Figure 7A:
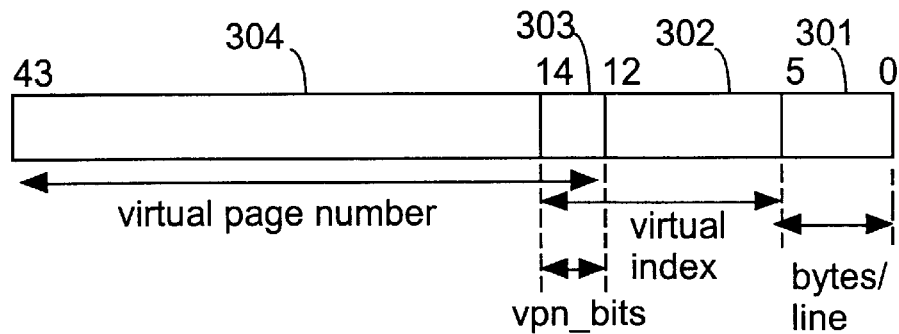
FIGS. 7A and 7B depict an exemplary map of the address bits in the virtual address used for addressing the L1 cache and the possible synonym locations in the L1 cache.

FIG. 7A illustrates the bits of the virtual memory address bits that are used for virtually indexing the L1 cache and the Dtags of the L2 cache. The lowest order bits 301, which range from bit 0 to bit 5 in the example, identify specific bytes within the cache line and correspond to the D bits discussed above in connection with FIGS. 3A and 3B. The virtual index used to identify a cache line to be accessed in the L1 cache consists of bits 302 and 303, which range from bit 6 to bit 14 in the example. Finally, the most significant bits 304, which range from bit 15 to bit 43 in the example, combined with bits 303 prescribe the virtual page number, also called the virtual page address.

The L1 cache's virtual index (i.e., the cache index) is determined by bits 302 and 303 of a specified virtual address, while the page number of the specified virtual address is determined by bits 303 and 304 of the virtual address. The overlapping bits of the virtual page number and the cache index are herein called the "vpn bits". In other words, the vpn bits 303 are the lowest order bits of the virtual page number and the highest order bits of the virtual index. The number of vpn bits, M, is equal to:

$$M = \text{ceiling}\left(\text{Log}_2\left(\frac{\text{cache size}}{\text{associativity} \times \text{pagesize}}\right)\right)$$

where the "ceiling" function rounds up the value to which the ceiling function is applied to the closest integer if that value is not already an integer. If the L1 cache is direct mapped, which means that the associativity is equal to 1, then the number of vpn bits is the number of bits required to represent the ratio of the cache size to the page size. For instance, if the L1 cache has a size of four pages, then the number (M) of vpn bits will be equal to 2.

The vpn bits of a virtual address identify which one of the possible N synonym cache index positions in the L1 cache corresponds to the specified virtual address. The other N-1 synonym cache index positions have the identical cache index value, except for the M most significant bits thereof. Because there are two vpn bits 303, at bit positions 13 and 14 in the example, there are four possible synonym locations in the example.

Figure 7B:
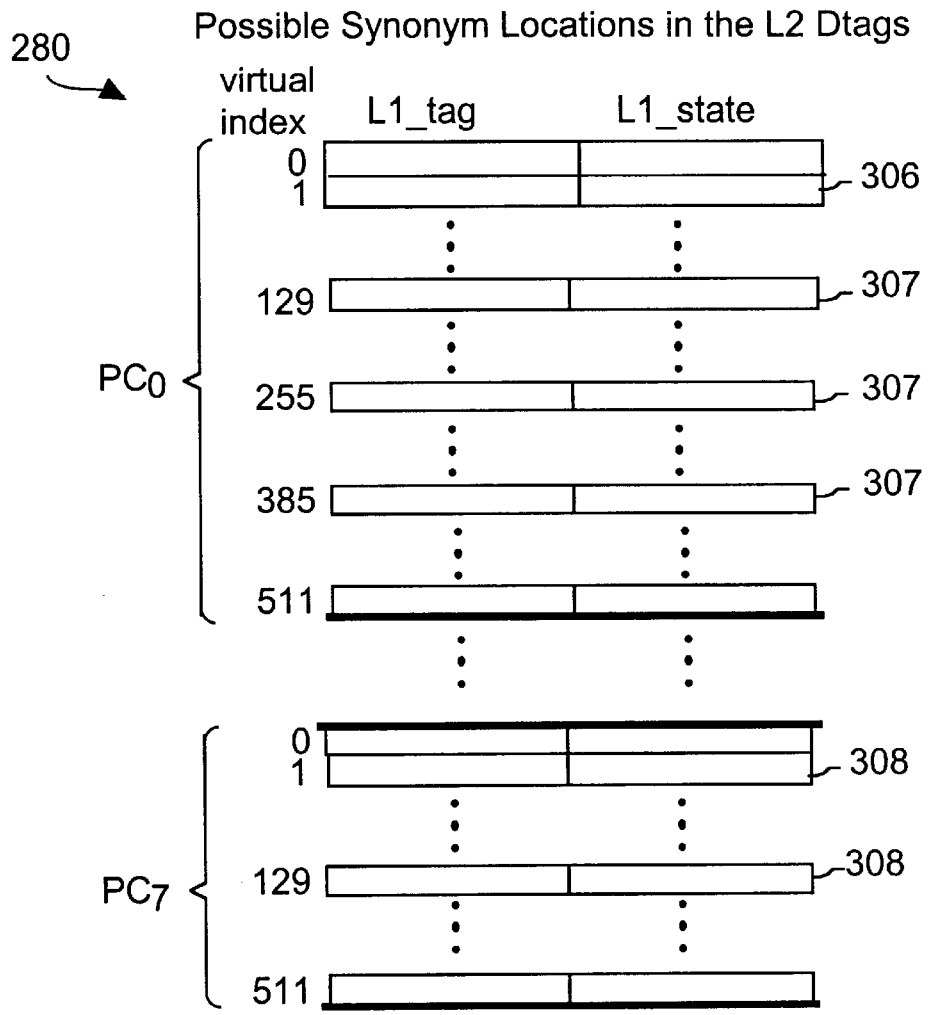

FIG. 7B shows an example of synonym locations in the Dtag array in the L2 cache 280, which correspond to synonym locations in the L1 cache. For a cache line 306 at virtual index 1, there are possible synonym locations 307 at virtual indices 129, 255, and 385. In addition to the possible synonym locations within the local L1 cache of the processor core ($PC_0$) from which the request for the memory address came, it is also possible for copies of the same memory line to be found in the L1 caches for the other processor cores (in the example shown in FIG. 7B from $PC_1$ through $PC_7$), and for each of those copies of the memory line to be stored at any of the synonym locations within the other L1 caches, for example at locations 308. Within each L1 cache at most one copy of the memory line will be stored at just one of the synonym locations.

L2 Lookup Control Logic

Figure 8A:
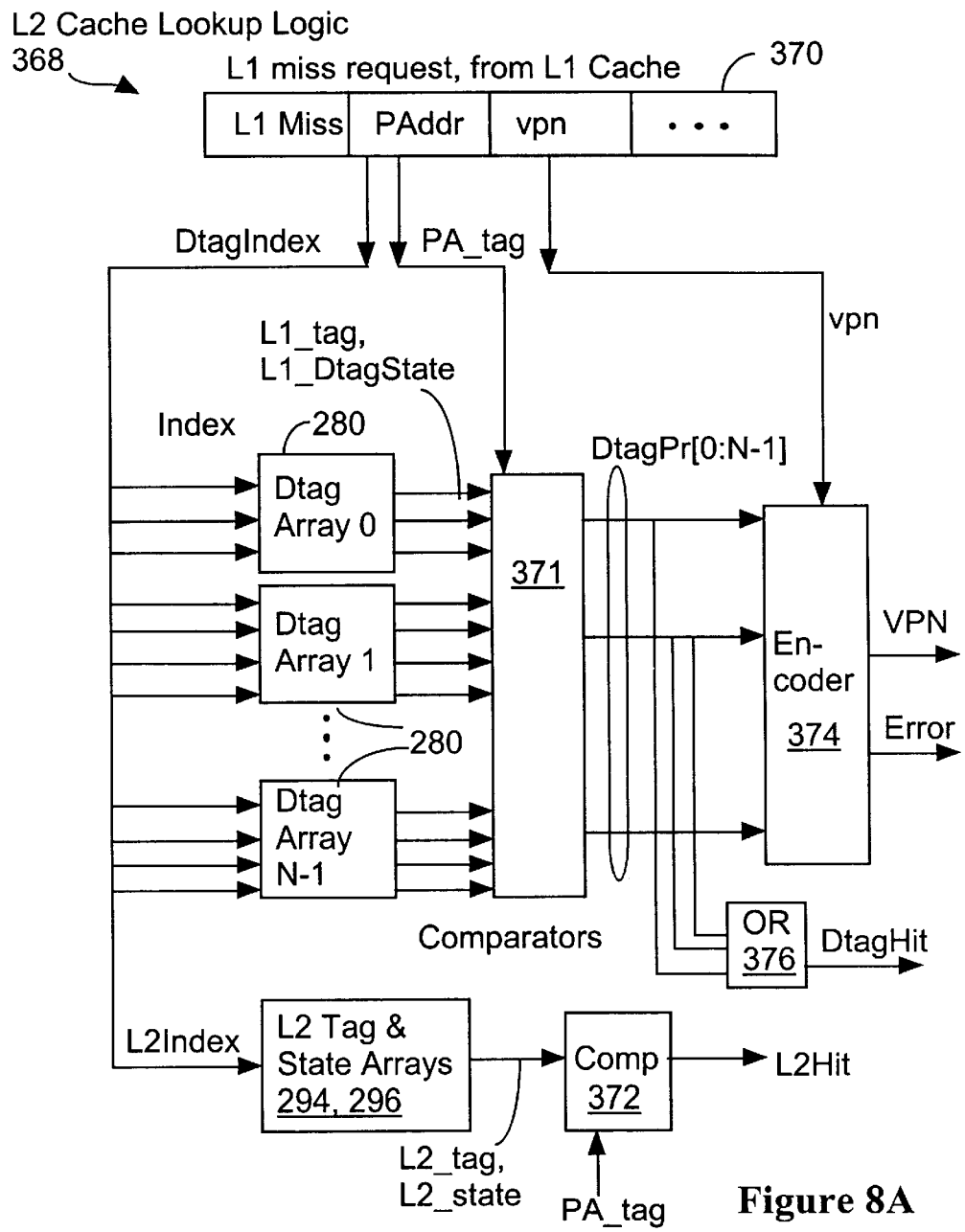
FIG. 8A is a block diagram of the control logic for the lookup of the L2 cache after a miss in the L1 cache.
Figure 8B:
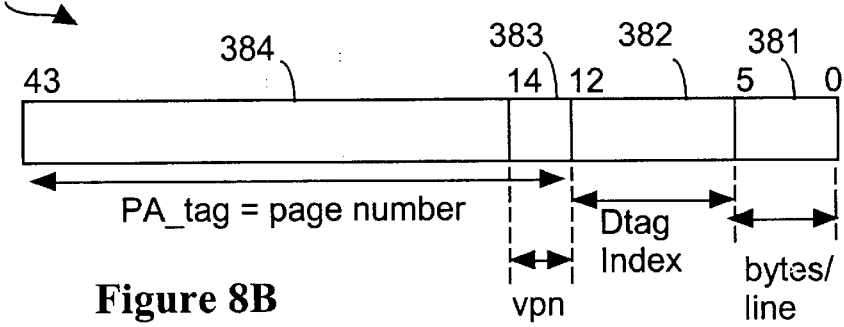
FIG. 8B depicts an exemplary map of the address bits in the physical address used for addressing the Dtag arrays and the L2 tag, state and data arrays in the L2 cache.

Referring now to FIGS. 8A and 8B, there is shown the control logic 368 for the lookup of the L2 cache after a miss occurs in the L1 cache. The L2 cache receives and buffers an L1 miss request 370 that includes the physical address (PAddr) of the requested cache line, the vpn bits of the virtual address specified by the processor core, and possibly other information not relevant to the present discussion. A first portion of bits of the physical address PAddr in the L1 miss request are used as the Dtag index, Dtagindex, for looking up tag and state information in a set of parallel Dtag arrays 280. The number of parallel Dtag arrays 280 is equal to the number, N, of synonym positions for any given memory line address. The Dtag arrays 280 are arranged in parallel, as shown in FIG. 8, to facilitate simultaneous lookup of the tag and state values for all possible synonym positions of the specified memory line. In the example given here, there are four Dtag arrays 280, and thus the Dtagindex includes two fewer bits than the virtual index used by the L1 cache to perform the L1 cache tag lookup.

FIG. 8B shows how various portions 381, 382, 383, 384 of the physical address (PAddr) in the L1 miss request correspond to signals used in the L2 control logic 368. It is to be understood that FIG. 8B is only an example, and that the particular division of bits between the Dtagindex, vpn and page number portions depends on size of the address space in the system, the number of cache index positions in the L1 cache, and the ratio of the cache size to the system's memory page size. Bits 382 of the physical address constitute the Dtagindex. It may be noted that bits 382 of the physical address are identical to bits 302 of all corresponding virtual addresses, because the boundaries of virtual pages coincide with the boundaries of physical memory pages. Also, the physical address specified in the L1 miss request will typically not include bits 381, because those address bits are used specify a particular byte or word within a cache line. If bits 381 are included in the physical address in the L1 miss request, these bits are ignored by the L2 control logic 368 for purposes of locating a synonym in the L1 cache or for locating a corresponding cache line in the L2 cache's data array.

The L1 tags stored in the Dtag arrays 280 at the N possible synonym locations are sent to comparators 371 and compared to the cache tag, PA_tag, for the requested cache line. The cache tag, PA_tag, is the page number portion of the physical address specified in the L1 miss request. In FIG. 8B, address bits 383 and 384 form the cache tag, PA_tag.

The comparators 371 not only compare the tag values in the N Dtag entries with PA_tag, to determine if there is match, the state value of each of the N Dtag entries is also inspected by the comparators 371 to determine if the state value indicates that the Dtag entry is invalid. The comparators 371 output a signal for each of the N Dtag entries having a first value (e.g., 1) if the tag in the Dtag entry matches the PA_tag and the state in the Dtag entry indicates a valid Dtag entry (i.e., the state is not the "invalid" state), and otherwise outputs a second value (e.g., 0). In other words, the comparators 371 generate N hit/miss signals, one for each synonym position of the requested cache line.

The N hit/miss signals are logically combined by an OR gate 378 (or logically equivalent circuitry) to produce a DtagHit signal, whose value indicates whether or not the requested cache line is stored in the L1 cache at any of the N synonym positions. The N hit/miss signals are also combined by an encoder 374 to generate a "VPN" value indicating which of the N synonym positions in the L1 cache contains the requested cache line. The VPN value has M bits, (where M is defined as above). The VPN bits, concatenated with (i.e., pre-pended to) the index bits 382 of the physical address, identify the cache index in the L1 cache containing the requested cache line.

The encoder 374 also generates an Error signal that is enabled only if the identified synonym position (i.e., VPN) of the requested cache line matches the "vpn" value in the L1 miss request. The VPN value generated by the encoder 374 must not match the "vpn" value in the L1 miss request, because this would indicate that the L1 cache erroneously failed to find the requested cache line at the original cache index read by the L1 cache. Thus the Error signal, if enabled, would indicate either an error in the L1 cache, a communication error between the L1 and L2 caches, an error in the Dtag arrays 280 or possibly some other system error.

Assuming the Error signal is not enabled and the DtagHit signal is enabled, indicating that a valid synonym was found by the L2 cache lookup logic 368, the L2 cache sends a reply message to the L1 cache. The reply message contains the VPN value generated by the encoder 374, along with the physical address (PAddr) and an indicator that the reply message is a response to an L1 miss request. The L1 cache locates the requested cache line by concatenating the VPN value in the reply message to the index bits 382 of the physical address PAddr from the cache index of the requested cache line.

At the same time that the Dtag lookup operation is performed, a lookup of the L2 tag and state arrays 294, 296 is also performed. The L2 tag at the appropriately indexed location is compared by another comparator 372 with the PA_tag to determine if they match. The L2 cache index is formed by a subset of the PAddr bits. The number of such address bits of the PAddr used to form the L2 cache index depends on the number of cache index positions in the L2 cache (i.e., the number of address bits used to form the L2 cache index is equal to $\log_2$(number of cache index positions in L2 cache)).

If the L2 tag matches the PA_tag, and the state value of the L2 cache line is not the "invalid" state, an L2Hit signal is generated and the contents of the L2 tag, state and data arrays are sent to the L1 cache.

Otherwise, if the Dtag lookup does not produce a Dtag hit and the L2 lookup also produces a miss, the requested cache line is retrieved from main memory.

L2 Finite State Machine—Responding to L1 Miss Request

Figure 9:
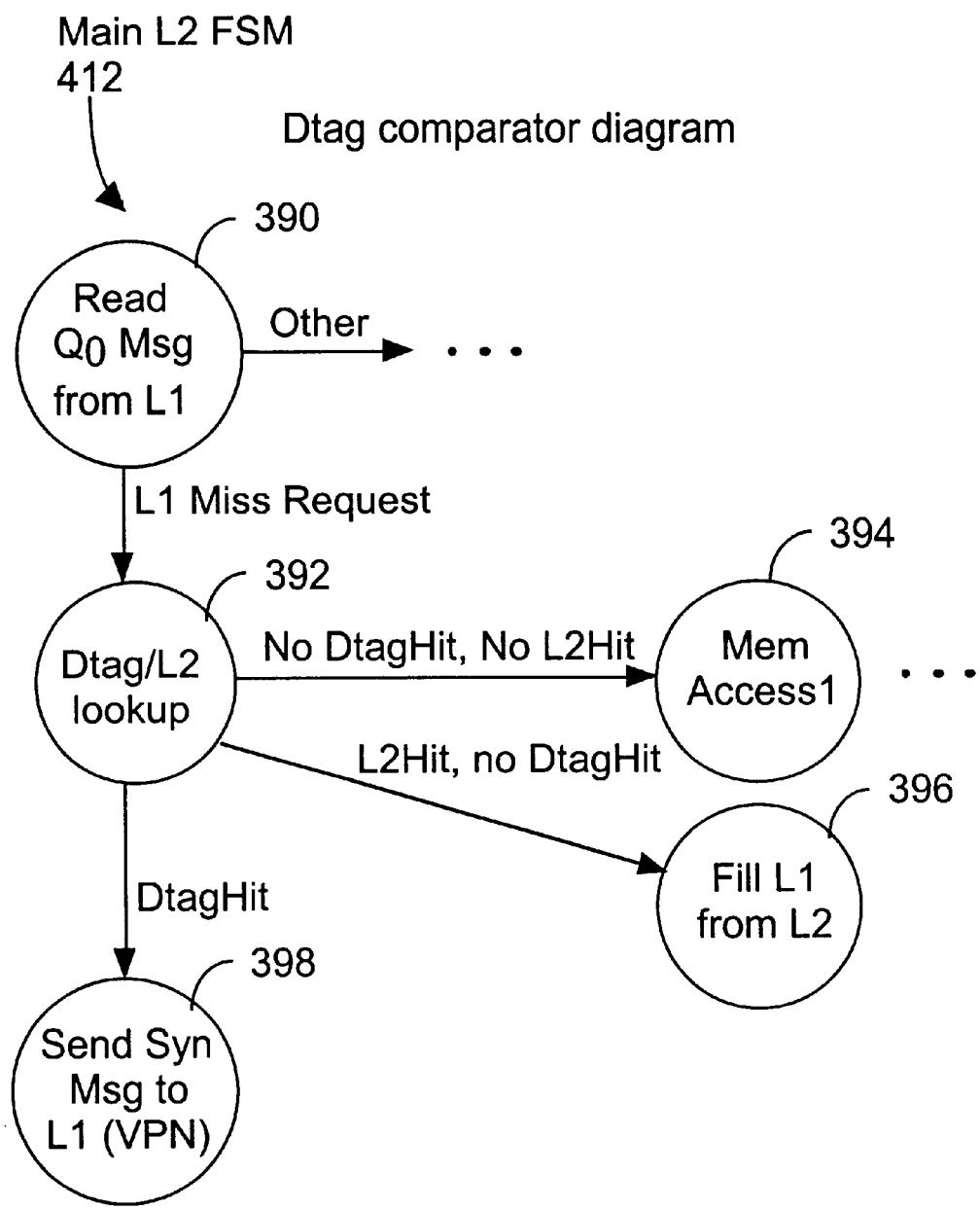
FIG. 9 is a diagram of a portion of the Main L2 finite state machine.

Referring to FIGS. 6 and 9, the portion of the Main L2 FSM that controls the operation of the L2 cache while responding to an L1 miss request is shown. The states of the Main L2 FSM shown in FIG. 9 occur after the L1 miss request has been received and buffered, and then selected for processing. Some of the states shown in FIG. 9 are typically implemented using multiple states or sub-states.

In state 390 the FSM determines if the message is an L1 miss request, or any another type of high priority message stored in the same high priority inbound message queue. If the message is an L1 miss request, the FSM proceeds to state 392, where it performs the Dtag and L2 tag/state lookup operations in parallel, as described above. Three possible outcomes are shown in FIG. 9, each of which is serviced by a different state of the FSM. If there is no Dtag hit and no L2 hit, then the FSM transitions to state 394, where it performs a main memory access. If there is an L2 hit, but no Dtag hit, then the FSM transitions to state 396, where it performs a main memory access, which typically involves sending a request to a memory controller and waiting for the memory controller to send back the requested cache line. The cache line is then sourced to the L1 cache, preferably bypassing the L2 tag, state and data arrays.

If the there is a DtagHit, the FSM transitions to state 398, where is sends a reply message back to the L1 cache, specifying the location of the synonym that contains the requested cache line. State 398 also causes the L2 cache lookup operation to be aborted so as to prevent the L2 data array from being needlessly accessed and/or to prevent a request from being sent to the memory controller.

The Main L2 FSM, in states 394, 396 and 398 (or in respective states following these states), also performs a Dtag update operation to update the Dtags to reflect the changes that will occur in the L1 cache when the requested cache line is stored in the L1 cache or when the identified synonym is moved from the synonym location to the cache index location associated with the virtual address specified by the processor core.

Not shown in FIG. 9 is an Error state, used for handling the rare (and logically impossible) situation where an Error signal is generated by the Dtag lookup result encoder 374 (FIG. 8A).

L1 Synonym Finite State Machine

Figure 10:
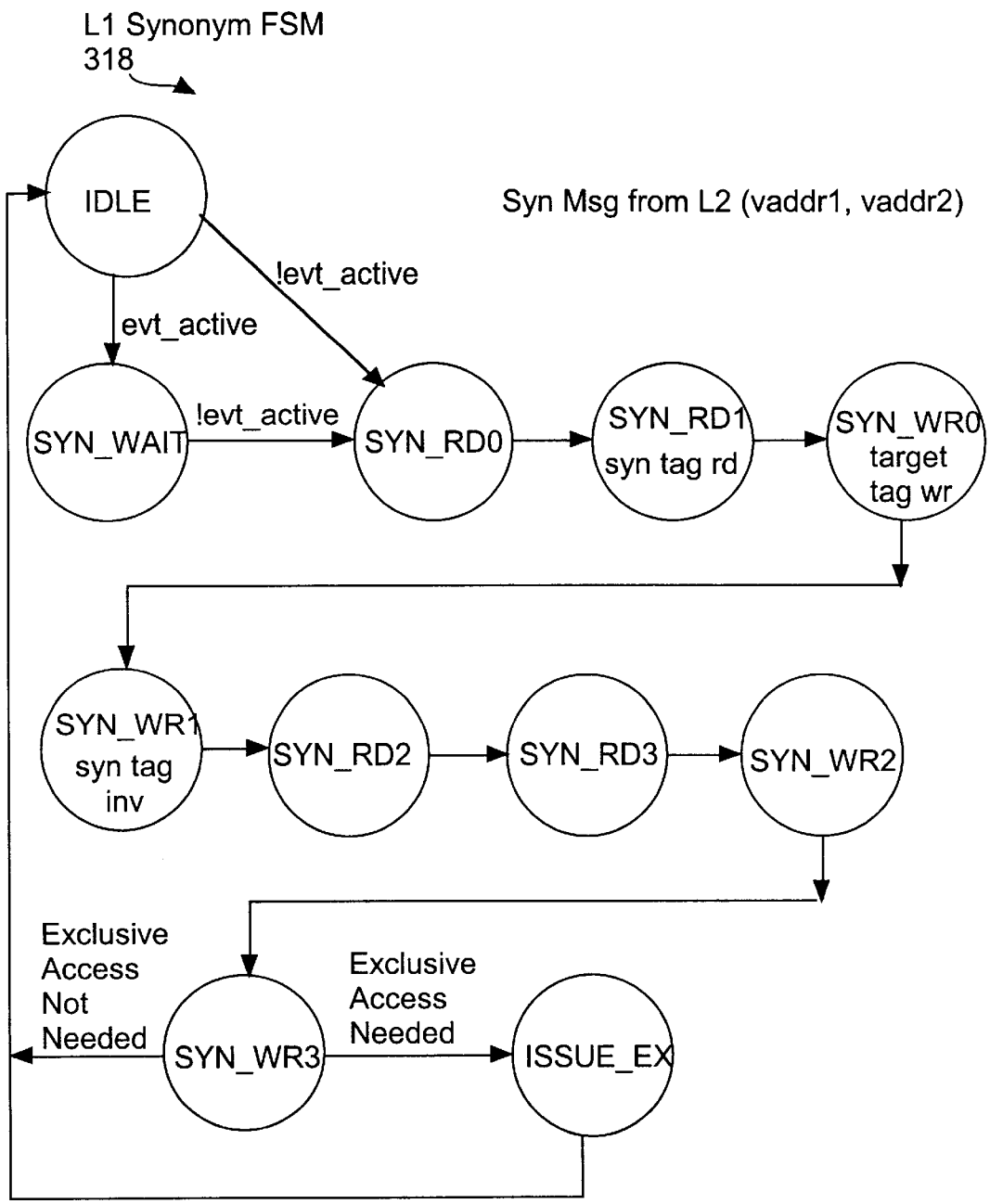
FIG. 10 is a diagram of the L1 Synonym finite state machine.

FIG. 10 depicts a state transition diagram for the L1 Synonym FSM 318. The L1 synonym FSM 318 is activated when the L1 cache receives a synonym reply message from the L2 cache, indicating that the Dtag lookup determined that a synonym of the requested cache line is present in the L1 cache. The reply message includes both the physical memory address, PAddr, for the requested cache line and the VPN bits needed to generate the L1 cache index at which a synonym of the cache line is located. As explained earlier, when the L1 cache miss is first detected, either the virtual address or the virtual cache index at which the request cache line is not found is stored by the L1 cache in the Miss Address buffer 315 (FIG. 4). The virtual address information in Miss Address buffer 315 is used by the Synonym FSM 318 to specify the target cache line to which data from a synonym cache line is to be written.

The L1 synonym FSM 318 generates the cache index of the synonym cache line by concatenating the received VPN bits (in the synonym reply message) with the index bits 382 (FIG. 8B) of the physical address PAddr (also obtained from either the synonym reply message). For clarity, the cache index of the synonym will herein be called the synonym cache index, or CacheIndex1, while the cache index derived from the processor core supplied virtual address will be called either the target cache index, or CacheIndex2. In an alternate embodiment, the L2 cache may generate the CacheIndex1 value and include it in the synonym reply message. In the same alternate embodiment or in another alternate embodiment, the physical address PAddr is not included in the synonym reply message, and instead the physical address PAddr for the synonym operation is obtained solely from the Miss Address buffer 315.

In the exemplary embodiment, it takes four read operations, each of which retrieves 16 bytes of a 64-byte cache line, to read a full cache line from the L1 data array 262 (FIG. 4). It also takes four write operations to write a cache line of information into the L1 data array 262. Of course, the number of reads and writes required to read or write a full cache line will vary from one implementation to another, depending on the cache line width (i.e., the amount of data stored in each cache line) and the width of the data paths within the L1 cache. While transferring information from one cache line to another within the L1 data array, successive quarter portions of the cache line being transferred are temporarily stored in staging buffer 323 (also called the data fill buffer 323, FIG. 4), which has a storage capacity of a half cache line in a preferred embodiment.

Once a synonym reply message has been received by the L1 cache, if the L1 cache is active (i.e., processing another request), the L1 synonym FSM is placed in the SYN_WAIT state until the L1 cache is no longer active, at which point the FSM transitions to the SYN_RD0 state. A first portion of the synonym cache line, at CacheIndex1, is read in the SYN_RD0 state, and then a second portion of the synonym cache line is read in the SYN_RD1 state. The two portions of the synonym cache line are temporarily stored in staging buffer 323 (FIG. 4). Also, the tag of the synonym cache line, at CacheIndex1 is read in the SYN_RD1 state and temporarily stored in the A3 buffer 334.

It is noted that once the Synonym FSM 318 reaches the SYN_RD0 state, the FSM then automatically transitions through the states SYN_RD1 to SYN_WR3 in sequence.

After the SYN_RD0 and SYN_RD1 state, the Synonym FSM 318 advances to the SYN_WR0 state, in which it stores the first portion of the synonym cache line in the target cache line, at CacheIndex2. Furthermore, in the SYN_WR0 state, the synonym FSM 318 causes the tag and state of the synonym cache line, obtained from the output of the A3 buffer 334, to be stored in the tag and state arrays 274, 266 at the CacheIndex2 position of those arrays. It is noted that the CacheIndex2 cache index value is obtained by the Synonym FSM from address bits in the Miss Address buffer 315.

In the SYN_WR1 state, the Synonym FSM 318 stores the second portion of the synonym cache line in the target cache line, at CacheIndex2. Furthermore, in the SYN_WR1 state, the synonym FSM 318 causes the tag of the synonym cache line, at CacheIndex1 to be invalidated by setting the state in the state array 266 to the "invalid" state value.

In the SYN_RD2 and SYN_RD3 states, third and forth portions of the synonym cache line, at CacheIndex1 are read and temporarily stored in staging buffer 323 (FIG. 4). Next, in the SYN_WR2 and SYN_WR3 states, the third and forth portions of the synonym cache line are written into the target cache line at CacheIndex2. At this point, the synonym cache line has been completed transferred to the target cache index in the L1 cache data array 262, and the tag and state arrays 274 and 266 have also been appropriately updated to reflect the relocation of the cache line. If the original request from the processor core asked for exclusive access to the specified cache line, but the state of the synonym cache line (at CacheIndex1) was "shared" (and thus not "exclusive"), the Synonym FSM 318 transitions from the SYN_WR3 state to the ISSUE_EX state, where it issues a request for exclusive access to the cache line and then waits until the exclusive access request is granted. In a preferred embodiment, the request for exclusive access to the specified cache line is sent to a cache coherence protocol engine via the ICS 112 (see FIGS. 1 and 4). Upon receiving the grant of exclusive access, the Synonym FSM 318 transitions back to the IDLE state.

If the original request from the processor core did not ask for exclusive access to the specified cache line, or if exclusive access was requested and the L1 cache already had exclusive access to the cache line (i.e., the state of the synonym cache line was "clean_exclusive" or "dirty_exclusive"), then the Synonym FSM 318 transitions from the SYN_WR3 state directly to the IDLE state, indicating that the Synonym transfer operation is complete.

In an alternate embodiment, a state for conditionally initiating a request for exclusive access to the specified cache line is inserted early in the synonym handling sequence, for example immediately after the SYN_RD1 state in which the synonym's tag and state are read. This additional state would be skipped by the Synonym FSM if the original request from the processor core did not ask for exclusive access to the specified cache line, or if exclusive access was requested and the L1 cache already had exclusive access to the cache line. After the SYN_WR3 state, if exclusive access to the specified cache line is needed and the synonym cache line was not in an exclusive state, the next state would be one that waits for receipt of the previously requested exclusive access.

Figure 11A:
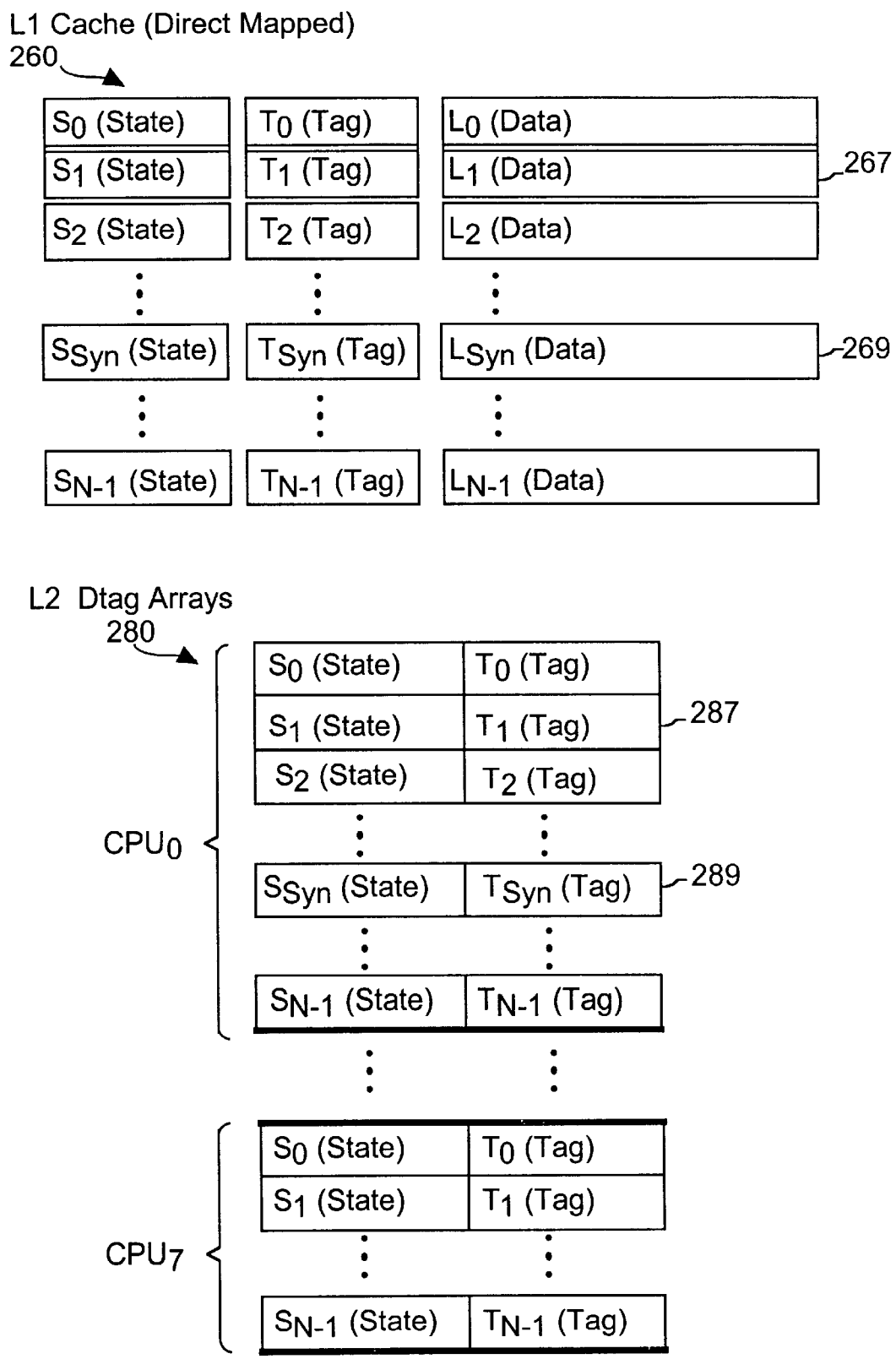
FIGS. 11A and 11B depict the L1 and L2 caches before and after a synonym is resolved in accordance with this invention.
Figure 11B:
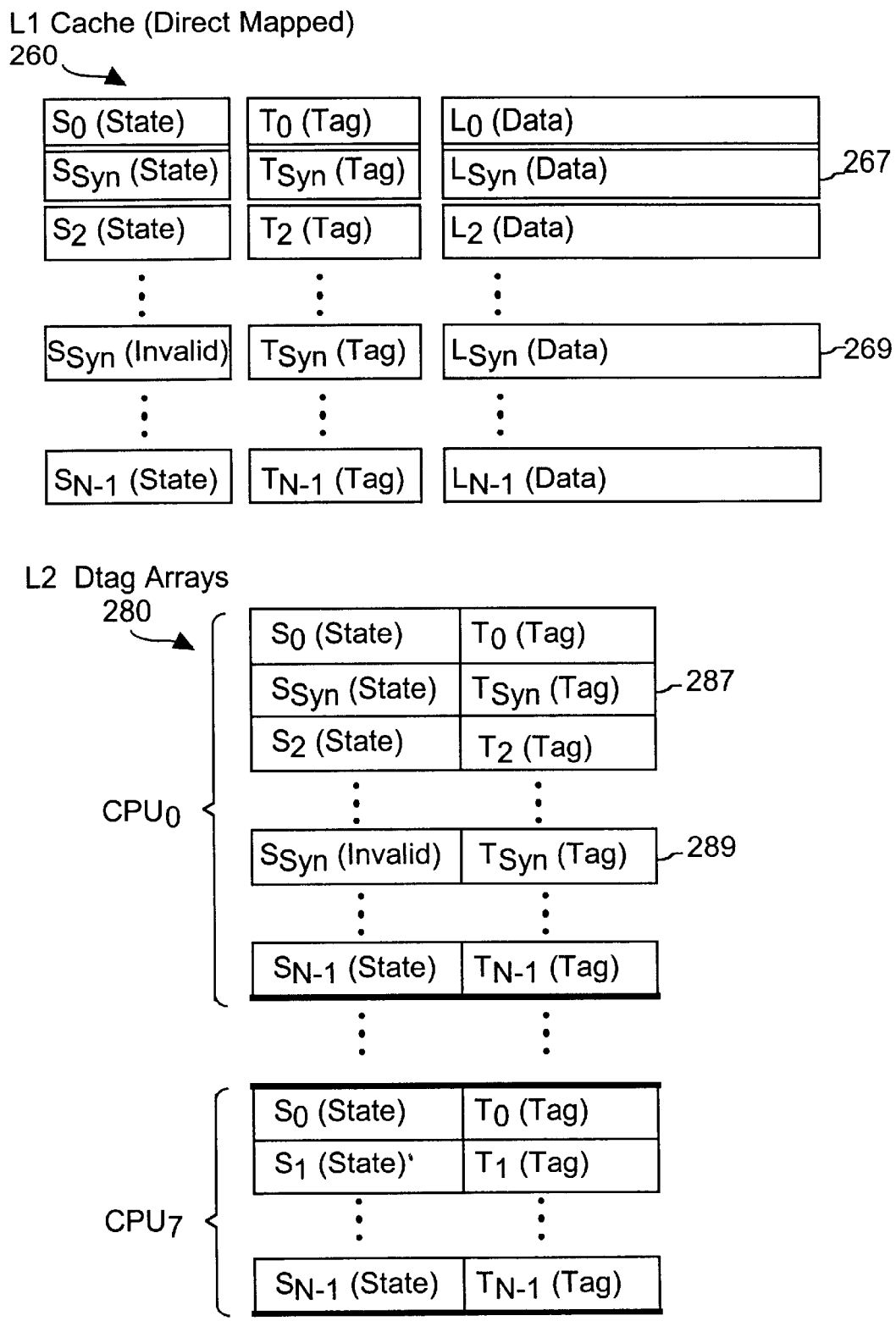

The changes to the L1 cache and the L2 Dtag arrays are illustrated in FIGS. 11A and 11B. FIG. 11A includes an illustration of a direct mapped L1 cache 260 with a synonym cache line 269 that corresponds to a targeted cache line 267, and L2 Dtag arrays with the synonym entry 289 corresponding to the targeted entry 287. FIG. 11B illustrates the L1 cache and L2 Dtag arrays after the synonym is found, using the Dtag arrays, and copied to the target cache line. In the L1 cache, the contents of the synonym cache line 269 have been copied into the targeted cache line 267 and the synonym cache line 269 has been invalidated. These changes are also reflected in the targeted entry 287 and the synonym entry 289 in the L2 cache.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for detecting and resolving virtual memory address synonyms in a multi-level cache hierarchy, the multi-level cache hierarchy comprising a first-level cache and a second-level cache wherein the first-level cache comprises a plurality of virtually indexed first-level cache lines each configured to store a physical memory address tag and state information, the method comprising:

maintaining a plurality of Dtags in the second-level cache, wherein each first-level cache line has an associated Dtag, and each Dtag includes state information for the first-level cache line and a copy of the physical memory address tag for the first-level cache line;

first searching the first-level cache for a targeted physical memory address tag at an original first-level cache line, wherein the targeted physical memory address tag and original first-level cache line correspond to a requested virtual memory address;

upon the first searching resulting in a miss, second searching the Dtags in the second-level cache to locate a synonym first-level cache line corresponding to the requested virtual memory address; and upon the second searching resulting in a hit,
      copying contents of the synonym first-level cache line to the original first-level cache line;
      invalidating the synonym first-level cache line; and
      updating the Dtags associated with the synonym first-level cache line and the original first-level cache line to reflect the copying and the invalidating.

2. The method of claim 1 wherein the first searching includes translating the requested virtual memory address into the corresponding targeted physical memory address tag, retrieving a cache tag at a cache index corresponding to the requested virtual memory address, and comparing the targeted physical memory address tag with the retrieved cache tag.

3. The method of claim 2 wherein the translating of the requested virtual memory address, into the corresponding targeted physical memory address tag, and the retrieving of the cache tag occur during overlapping time periods.

4. The method of claim 1 wherein the second searching comprises searching a plurality of the Dtags simultaneously.

5. The method of claim 1 wherein the second-level cache comprises a plurality of second-level cache lines each configured to store a physical memory address tag, the method further comprising searching the second-level cache lines for a physical memory address tag that corresponds to the requested virtual memory address tag concurrently with the second searching.

6. The method of claim 1 wherein
   the requested virtual memory address includes a first set of address bits representing a virtual page number and a second set of address bits representing a virtual cache index, the first and second sets of address bits overlapping at a set of vpn bits; and
   the second searching, when resulting in a hit, generates a set of VPN bits that, when used to replace the vpn bits of the virtual cache index, produces a synonym cache index that identifies a location in the first-level cache of the synonym first-level cache line.

7. The method of claim 1, wherein the multi-level cache hierarchy further comprises a plurality of first-level caches that share a single second-level cache, the method further comprising maintaining a plurality of Dtags in the second-level cache for each of the plurality of the first-level caches.

8. A multi-level cache system comprising:
   a first-level cache comprising a plurality of virtually indexed first-level cache lines each configured to store a physical memory address tag and state information;
   a second-level cache comprising a plurality of second-level cache lines and a plurality of Dtags, wherein each first-level cache line of the plurality of virtually indexed first-level cache lines has an associated Dtag among the plurality of Dtags, and each Dtag includes state information for the first-level cache line and a copy of the physical memory address tag for the first-level cache line;
   a first-level comparator located in the first-level cache and configured to compare a targeted physical memory address, translated from a requested virtual memory address, with the physical memory address tag stored at an original first-level cache line corresponding to the requested virtual memory address, the first-level comparator configured to generate a miss indicator when the targeted physical memory address and the physical memory address tag stored at the original first-level cache line do not match;
   Dtag logic located in the second-level cache, responsive to a message conveying the miss indicator, and configured to search the Dtags in the second-level cache to locate a synonym first-level cache line corresponding to the requested virtual memory address;
   a first-level controller in the first-level cache configured to:
      copy contents of the synonym first-level cache line to the original first-level cache line; and
      invalidate the synonym first-level cache line;
   a second-level controller in the second-level cache configured to update the Dtags associated with the synonym first-level cache line and the original first-level cache line to reflect the copying of the synonym first-level cache line to the original first-level cache line and invalidation of the synonym first-level cache line.

9. The multi-level cache system of claim 8 wherein
   the original first-level cache line corresponds to an original cache index derived from the requested virtual memory address;
   the Dtag logic includes:
      a Dtag comparator configured to compare the targeted physical memory address with an additional physical memory address tag stored in the Dtag corresponding to a synonym cache index, the synonym cache index comprising a cache index corresponding to the targeted physical address and distinct from the original cache index; and logic configured to generate a result signal representing at least a portion of the synonym cache index when the second-level comparator determines that the targeted physical memory address matches the additional physical memory address tag stored at in the Dtag corresponding to a synonym cache index.

10. The multi-level cache system of claim 8 wherein the original first-level cache line corresponds to an original cache index derived from the requested virtual memory address;

the Dtag logic includes:

a Dtag comparator configured to compare the targeted physical memory address with a plurality of additional physical memory address tags stored in the Dtags corresponding to a plurality of synonym cache indices, each of the synonym cache indices comprising a cache index corresponding to the targeted physical address and distinct from the original cache index; and logic configured to generate a result signal representing at least a portion of an identified synonym cache index, identified by the second-level comparator from among the plurality of synonym cache indices when the second-level comparator determines that the targeted physical memory address matches the additional physical memory address tag stored at in the Dtag corresponding to the identified synonym cache index.

11. The multi-level cache system of claim 8, wherein the second-level cache includes a plurality of second-level cache lines each configured to store a physical memory address tag and a cache line of data; and a second comparator configured to compare the targeted physical memory address to a second-level physical memory address tag at a specified second-level cache line, wherein the specified second-level cache line corresponds to the targeted physical memory address.

12. The multi-level cache system of claim 11 wherein the second comparator and the Dtag logic are configured to compare the targeted physical memory address with physical memory address tags in the second-level cache lines and in the Dtags during overlapping time periods.

13. The multi-level cache system of claim 11 wherein the second comparator and the Dtag logic are configured to simultaneously compare the targeted physical memory address with physical memory address tags in the second-level cache lines and in the Dtags.

14. The multi-level cache system of claim 8 wherein the requested virtual memory address includes a first set of address bits representing a virtual page number and a second set of address bits representing a virtual cache index, the first and second sets of address bits overlapping at a set of vpn bits; and the Dtag logic includes circuitry that generates a set of VPN bits that, when used to replace the vpn bits of the virtual cache index, produces a synonym cache index that identifies a location in the first-level cache of the synonym first-level cache line.

15. The multi-level cache system of claim 8 comprising a plurality of first-level caches that share a single second-level cache wherein the second-level cache includes Dtags for a plurality of the first-level caches.

* * * * *